(12) United States Patent
Hiyama et al.

(10) Patent No.: US 12,345,819 B2
(45) Date of Patent: Jul. 1, 2025

(54) LIGHT RECEIVING DEVICE, RANGING SYSTEM, AND LIGHT RECEIVING METHOD

(71) Applicant: C/O SONY SEMICONDUCTOR SOLUTIONS CORPORATION, Kanagawa (JP)

(72) Inventors: Kouta Hiyama, Kanagawa (JP); Katsuyuki Yonezawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1001 days.

(21) Appl. No.: 17/426,481

(22) PCT Filed: Jan. 24, 2020

(86) PCT No.: PCT/JP2020/002471
§ 371 (c)(1),
(2) Date: Jul. 28, 2021

(87) PCT Pub. No.: WO2020/162223
PCT Pub. Date: Aug. 13, 2020

(65) Prior Publication Data
US 2022/0107420 A1    Apr. 7, 2022

(30) Foreign Application Priority Data
Feb. 5, 2019    (JP) .................. 2019-018987

(51) Int. Cl.
*G01C 3/08* (2006.01)
*G01C 3/06* (2006.01)
(Continued)

(52) U.S. Cl.
CPC ............. *G01S 17/894* (2020.01); *G01C 3/06* (2013.01); *G01S 7/4863* (2013.01); *G01S 7/4865* (2013.01); *H04N 25/445* (2023.01)

(58) Field of Classification Search
CPC .... G01S 17/894; G01S 7/4863; G01S 7/4865; H04N 25/445; G01C 3/06
See application file for complete search history.

(56) References Cited

U.S. PATENT DOCUMENTS 6,301,003 B1    10/2001  Shirai
2015/0285625 A1*  10/2015  Deane .................. G01S 7/4816
                                                        348/140
(Continued)

FOREIGN PATENT DOCUMENTS

CN    106165399 A    11/2016
DE    112015001704 T5    12/2016
(Continued)

OTHER PUBLICATIONS

International Search Report and Written Opinion of PCT Application No. PCT/JP2020/002471, issued on Apr. 7, 2020, 11 pages of ISRWO.

*Primary Examiner* — Mark Hellner
(74) *Attorney, Agent, or Firm* — CHIP LAW GROUP

(57) ABSTRACT

An object of the present technology is to provide a light receiving device by which an optical displacement having occurred in a light receiving section during manufacturing and assembling, etc. can be corrected. The light receiving device (10) of the present technology includes a light receiving section (2) including a pixel array (16), and a control section (3) that defines multiple pixels included in the pixel array (16) as an active pixel (Pa) and a non-active pixel (Pb) and causes a signal outputted from a pixel defined as the active pixel (Pa) to be outputted from the light receiving section (2).

9 Claims, 21 Drawing Sheets

(51) Int. Cl.
    *G01S 7/4863*     (2020.01)
    *G01S 7/4865*     (2020.01)
    *G01S 17/894*     (2020.01)
    *H04N 25/445*     (2023.01)

(56)              References Cited

U.S. PATENT DOCUMENTS

| | | |
|---|---|---|
| 2017/0242108 A1 | 8/2017 | Dussan |
| 2018/0124342 A1 | 5/2018 | Uyeno et al. |
| 2020/0041618 A1* | 2/2020 | Pelz ................ G01S 7/4815 |
| 2020/0158838 A1* | 5/2020 | Henderson ........ G01S 7/4815 |
| 2022/0026574 A1* | 1/2022 | Vaello Paños ....... G06V 10/145 |

FOREIGN PATENT DOCUMENTS

| | | |
|---|---|---|
| DE | 102016114432 A1 | 2/2018 |
| EP | 3279685 A1 | 2/2018 |
| JP | 2011-179925 A | 9/2011 |
| JP | 2016-211881 A | 12/2016 |
| JP | 2017-123533 A | 7/2017 |
| JP | 2017-520134 A | 7/2017 |
| JP | 2018-059898 A | 4/2018 |
| KR | 10-2016-0142839 A | 12/2016 |
| WO | 2015/157341 A1 | 10/2015 |
| WO | 2017/119166 A1 | 7/2017 |

* cited by examiner

LIGHT RECEIVING DEVICE, RANGING SYSTEM, AND LIGHT RECEIVING METHOD

CROSS REFERENCE TO RELATED APPLICATIONS

This application is a U.S. National Phase of International Patent Application No. PCT/JP2020/002471 filed on Jan. 24, 2020, which claims priority benefit of Japanese Patent Application No. JP 2019-018987 filed in the Japan Patent Office on Feb. 5, 2019. Each of the above-referenced applications is hereby incorporated herein by reference in its entirety.

TECHNICAL FIELD

A technology (present technology) according to the present disclosure relates to a light receiving device, a ranging system, and a light receiving method.

BACKGROUND ART

A time-of-flight (ToF) ranging system that conducts measurement using a Direct Time of Flight (Direct ToF) method has been known (see PTL 1).

CITATION LIST

Patent Literature

[PTL 1]
Japanese Patent Laid-Open No. 2016-211881

SUMMARY

Technical Problem

In ranging systems, in a case where an optical displacement occurs in a light receiving section during manufacturing and assembling, correction of the displacement is required. PTL 1 does not describe measures for correcting an optical displacement during manufacturing and assembling, or any specific circuit configuration between multiple pixels and a time measuring section.

An object of the present technology is to provide a light receiving device, a ranging system, and a light receiving method, by which an optical displacement having occurred in a light receiving section during manufacturing and assembling, etc. can be corrected.

Solution to Problem

A light receiving device according to one aspect of the present technology includes a light receiving section including a pixel array, and a control section that defines multiple pixels included in the pixel array as an active pixel and a non-active pixel and causes a signal outputted from a pixel defined as the active pixel to be outputted from the light receiving section.

A ranging system according to one aspect of the present technology includes a light emitting section that emits light, a light receiving section including a pixel array that receives reflection light resulting from reflection of the emitted light by an object, a control section that defines multiple pixels included in the pixel array as an active pixel and a non-active pixel and causes a signal outputted from a pixel defined as the active pixel to be outputted from the light receiving section, and a ranging processing section that, on the basis of the signal outputted from the active pixel, calculates a distance to the object according to a time interval between light emission from the light source and reception of the reflection light at the light receiving section.

A light receiving method according to one aspect of the present technology includes defining multiple pixels included in a pixel array as an active pixel and a non-active pixel, the pixel array being included in a light receiving section, and causing a signal outputted from a pixel defined as the active pixel to be outputted from the light receiving section.

DESCRIPTION OF EMBODIMENTS

Hereinafter, first to third embodiments of the present technology will be explained with reference to the drawings. Throughout the drawings to which reference will be made in the following explanation, the same or similar components are denoted by the same or similar reference signs. However, it is to be noted that, since the drawings depict schematic views, the relation between a thickness and a planar dimension, the thickness ratio of layers, and the like are different from actual ones. Therefore, specific thicknesses and specific dimensions should be determined in light of the following explanation. In addition, it goes without saying that a dimensional relation or ratio partially varies among the drawings. It is to be noted that the effects described herein are just examples and are not limitative, and further, any other effect may be provided.

First Embodiment

Figure 1:
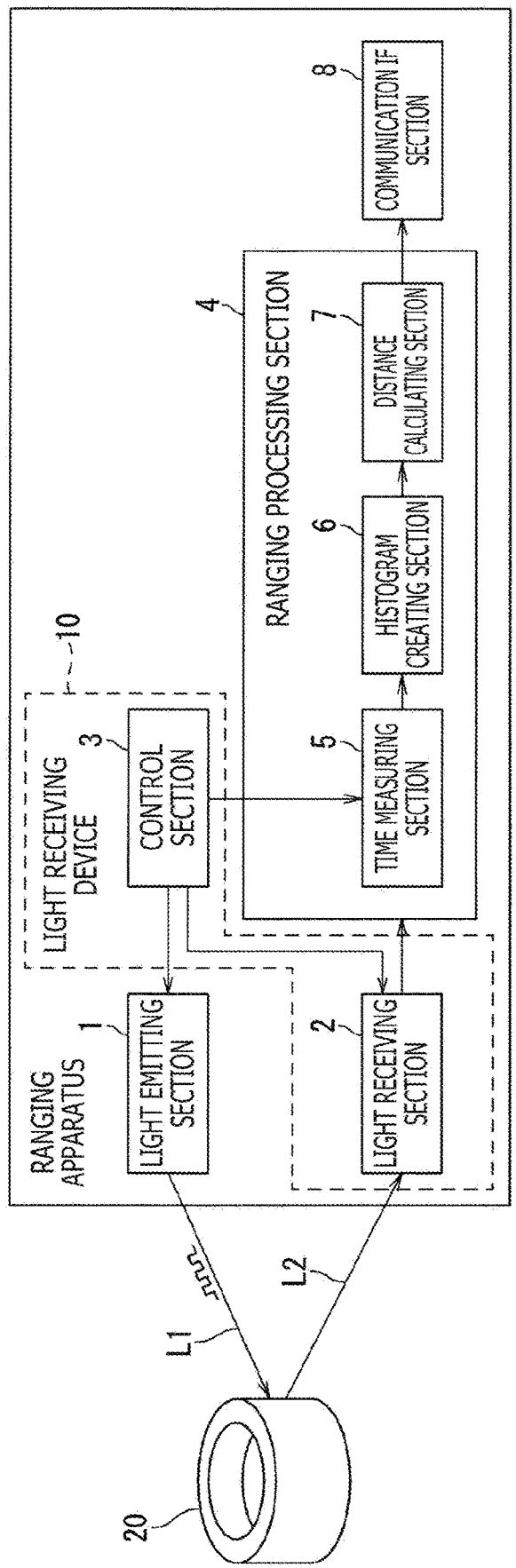
FIG. 1 is a block diagram illustrating one example of a ranging system according to a first embodiment of the present technology.

As illustrated in FIG. 1, a ranging system according to the first embodiment of the present technology is a direct ToF ranging sensor including a light emitting section 1 that emits ranging light L1, a light receiving section 2 that receives ranging light L2, a control section 3 that performs general control of the ranging system, a ranging processing section 4 that executes processes necessary to conduct ranging, and a communication interface (IF) section 8 that transmits a signal outputted from the ranging processing section 4 to an external circuit. In the ranging system according to the first embodiment of the present technology, a light receiving device 10 according to the first embodiment includes at least the light receiving section 2 and the control section 3. The light receiving device 10 according to the first embodiment may further include the ranging processing section 4 and the communication IF section 8.

The light emitting section 1, the light receiving section 2, the control section 3, the ranging processing section 4, and the communication IF section 8 may be monolithically and integrally formed by, for example, a System on a Chip (SoC) configuration of a Complementary Metal Oxide Semiconductor (CMOS), a Large Scale Integration (LSI), or the like. Alternatively, the light emitting section 1 and the light receiving section 2, etc. may each be formed as a separate LSI chip. For example, the light emitting section 1 may include one chip, and the light receiving device 10 including the light receiving section 2 may include one chip.

Figure 2:
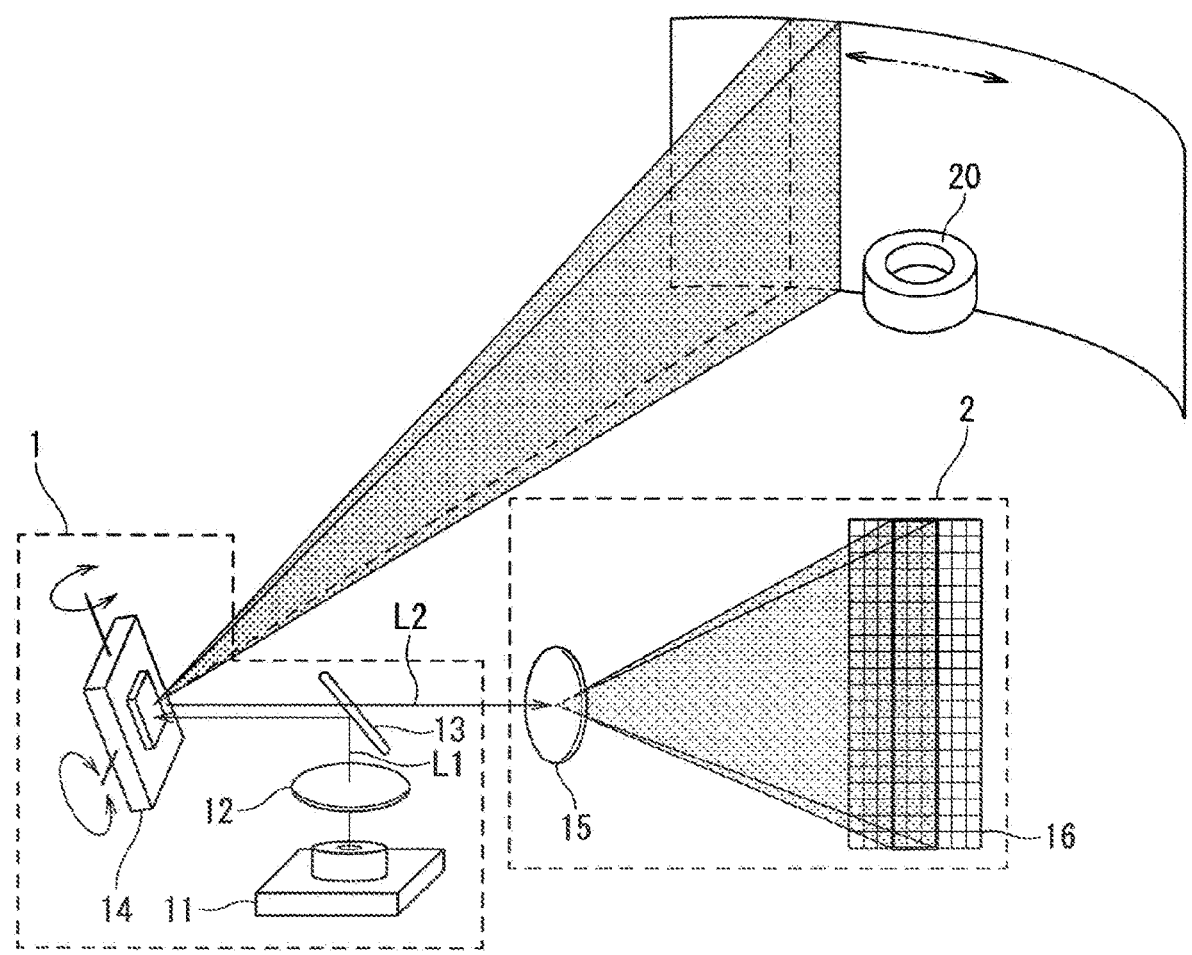
FIG. 2 is a schematic view of one example of the ranging system according to the first embodiment of the present technology.

As illustrated in FIG. 2, the light emitting section 1 includes a light source 11 that emits the ranging light L1. For example, laser light can be used as the light L1. For example, an edge emitting semiconductor laser or a surface emitting semiconductor laser can be used as the light source 11. The light source 11 is driven by a trigger pulse from the control section 3. As the trigger pulse, a rectangular pulse signal having a predetermined repetition frequency and a predetermined pulse width, for example, can be used. The light emitting section 1 has a scanning mechanism for performing raster scanning of the light L1. As the scanning mechanism, a mirror-scanning-type scanning mechanism including an emitter lens 12, a projection mirror 13, and a micromirror 14 is illustrated in FIG. 2.

According to a control signal from the control section 3, the direction of a reflection surface of the micromirror 14 to reflect the light L1 is changed. The light L1 emitted by the light source 11 outgoes in a direction corresponding to the reflection surface of the micromirror 14, via the emitter lens 12, the projection mirror 13, and the micromirror 14. The outgoing light L1 is reflected by an object 20, and the reflected light (reflection light) L2 enters the light receiving section 2 via the micromirror 14 and the projection mirror 13. The object 20 is not limited to a particular object. An object existing around the ranging system may be used as the object 20 in a case where the ranging system is a mobile apparatus, for example. Alternatively, a pedestrian, a bicycle, a vehicle, or the like existing around a vehicle having the ranging system installed therein may be used as the object in a case where the ranging system is an on-vehicle system. Moreover, the light emitting section 1 may be a dot projector that includes no mechanical scanning mechanism, and that projects a plurality of dot patterns onto the object 20.

The light receiving section 2 includes a receiver lens 15 and a pixel array 16. The pixel array 16 includes multiple pixels that are arranged in a two-dimensional matrix shape. For example, as each of the pixels, a single photon avalanche diode (SPAD) that outputs an electric signal upon reacting to received light can be used. The light receiving section 2 collects the reflection light L2 having entered the light receiving section 2 via the micromirror 14 and the projection mirror 13, by using the receiver lens 15, and causes a pixel that corresponds to the scanning direction of the light L1 to receive the light L2. An electric signal from the pixel is outputted to the ranging processing section 4.

The control section 3 illustrated in FIG. 1 performs general control of operation of the ranging system. The control section 3 includes a microprocessor. The control section 3 outputs a trigger pulse to the light source 11 and a time measuring section 5 at every predetermined light-emission cycle.

On the basis of a timing of emission of the light L1 from the light source 11 and a timing of reception of the reflection light L2 at the light receiving section 2, the ranging processing section 4 calculates the distance to the object 20. The ranging processing section 4 can include a signal processor. The ranging processing section 4 includes the time measuring section 5, a histogram creating section 6, and a distance calculating section 7.

For example, as the time measuring section 5, a time measuring circuit (Time-to-Digital Converter: TDC) can be used. The time measuring section 5 converts a time interval (time of arrival) between emission of the light L1 from the light source 11 and reception of the reflection light L2 at a pixel to a digital value, on the basis of a trigger pulse transmitted from the control section 3 in order to drive the light source 11 and of an electric pulse signal transmitted from the light receiving section 2. For example, a numerical value ranging from 0 to 255 can be used as the digital value. The time measuring section 5 outputs the digital value obtained by the conversion to the histogram creating section 6.

The histogram creating section 6 creates a histogram by performing accumulation based on binary numbers (bin)

obtained by the conversion at the time measuring section 5. The histogram is held, in a memory, not illustrated, as a kind of a data structure or a table, for example. The histogram is created for each pixel. Each time receiving the digital value outputted from the time measuring section 5, the histogram creating section 6 updates the histogram by incrementing the value of the corresponding binary number. The histogram creating section 6 outputs the created histograms to the distance calculating section 7.

By referring to each histogram created by the histogram creating section 6, the distance calculating section 7 detects a peak value (digital value) in the histogram and calculates the distance to the object 20, from a time of arrival that corresponds to the detected peak value (digital value). That is, when the reflection light L2, which results from reflection of the emitted light L1 by the object 20, is received, the time of arrival represents a time interval of reciprocation to and from the object 20. Therefore, the time of arrival is multiplied with c/2 (where c represents the speed of light), whereby the distance to the object 20 can be calculated for each pixel. Then, on the basis of the distances calculated for the respective pixels in the pixel array 16, a distance image can be obtained. Data (ranging data) concerning the distance image is outputted to the communication IF section 8.

The communication IF section 8 outputs, to the outside, the ranging data calculated by the ranging processing section 4. The ranging system according to the first embodiment of the present technology is configured to be communicable with an external host IC via the communication IF section 8, although this configuration is not illustrated. For example, as the communication IF section 8, an interface circuit conforming to the Mobile Industry Processor Interface (MIPI), a Serial Peripheral Interface (SPI), or an Inter-Integrated Circuit ($I^2C$) may be used, or an interface having one or more of these interface circuits mounted thereon may be used.

In the ranging system according to the first embodiment of the present technology, the control section 3 defines the multiple pixels constituting the pixel array 16 of the light receiving section 2, as active pixels and non-active pixels. The control section 3 may define multiple pixel defining ranges in the pixel array 16, and may define an active pixel in each of the multiple pixel defining ranges. In this case, in order to obtain the degree of freedom of the arrangement of active pixels, the control section 3 may define the multiple pixel defining ranges in such a way that the multiple pixel defining ranges partially overlap each other.

For example, in order to, for example, correct an al displacement during manufacturing and assembling, the control section 3 defines, as active pixels, pixels that can properly receive the reflection light L2, among the multiple pixels constituting the pixel array 16 of the light receiving section 2, and further, defines, as non-active pixels, the pixels other than the active pixels. Data (correction data) for correcting an optical displacement during manufacturing and assembling may, for example, be previously measured, and be stored in a memory the illustration of which is omitted. The control section 3 may read out the correction data from the memory and define active pixels and non-active pixels on the basis of the read correction data.

Then, the control section 3 causes a signal outputted from a pixel defined as an active pixel to be outputted from the light receiving section 2 to the time measuring section 5. For example, the control section 3 may cause only a signal outputted from a pixel defined as an active pixel to be outputted from the light receiving section 2 to the time measuring section 5, while causing no signal outputted from a pixel defined as a non-active pixel to be outputted from the light receiving section 2 to the time measuring section 5.

Figure 3:
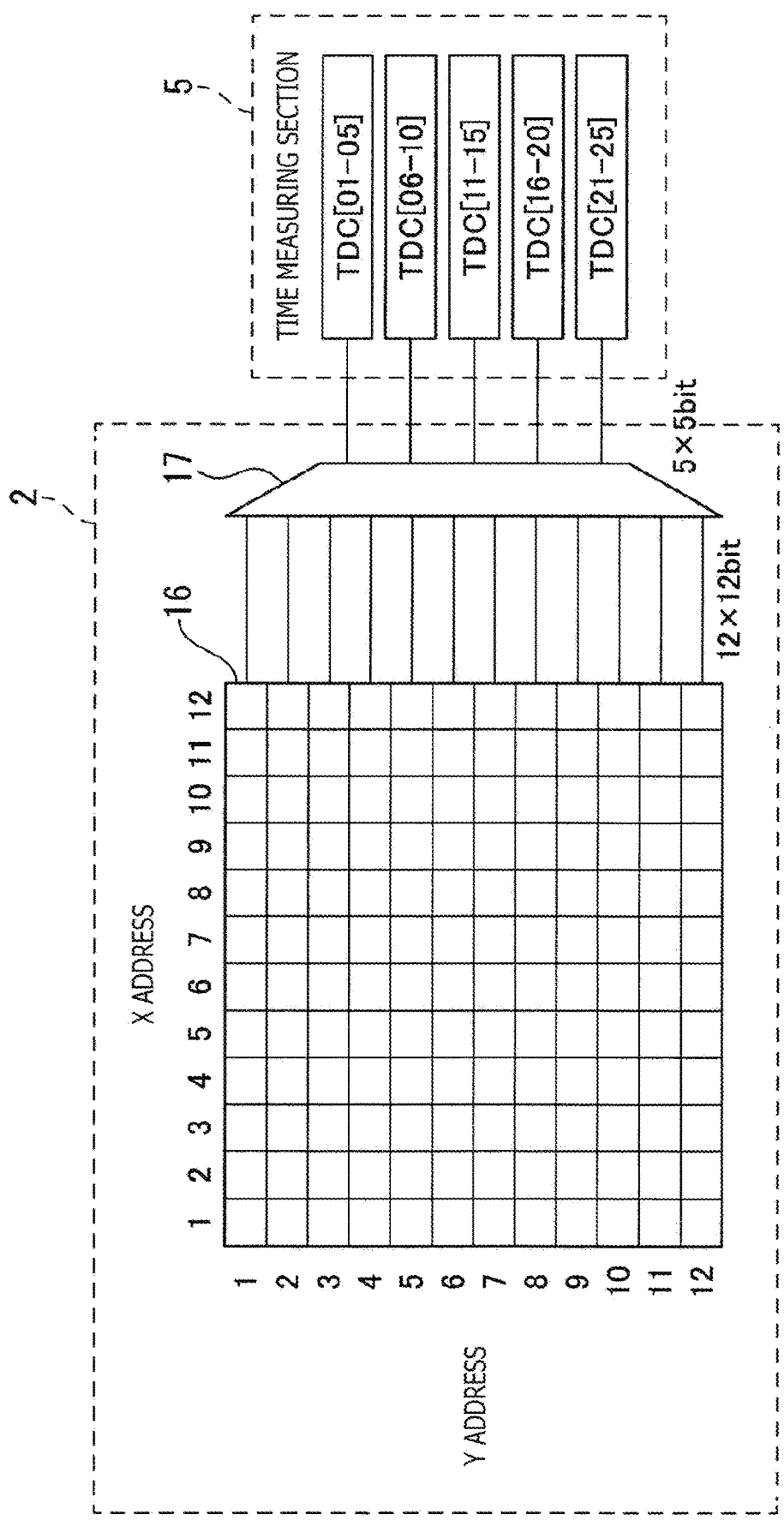
FIG. 3 is a schematic view of one example of a light receiving device according to the first embodiment of the present technology.

For example, it is assumed that the pixel array 16 of the light receiving section 2 has 12×12 pixels, and 5×5 active pixels among the 12×12 pixels are defined, as illustrated in FIG. 3. The light receiving section 2 includes a selection section 17. An input side of the selection section 17 is connected to each of the pixels in the pixel array 16, and an output side of the selection section 17 is connected to the time measuring section 5. The selection section 17 can output signals outputted from 5×5=25 pixels defined as active pixels, to each of 25 time measuring circuits (TDC) constituting the time measuring section 5, for example.

For example, by outputting a control signal to the selection section 17, the control section 3 causes the selection section 17 to select signals outputted from the pixels defined as the active pixels only and causes the signals to be outputted to the time measuring section 5. It is to be noted that, by outputting a control signal also to the multiple pixels constituting the pixel array 16, the control section 3 may perform control to cause only the pixels defined as active pixels to output signals, without causing only the pixels defined as non-active pixels to output signals.

Figure 4:
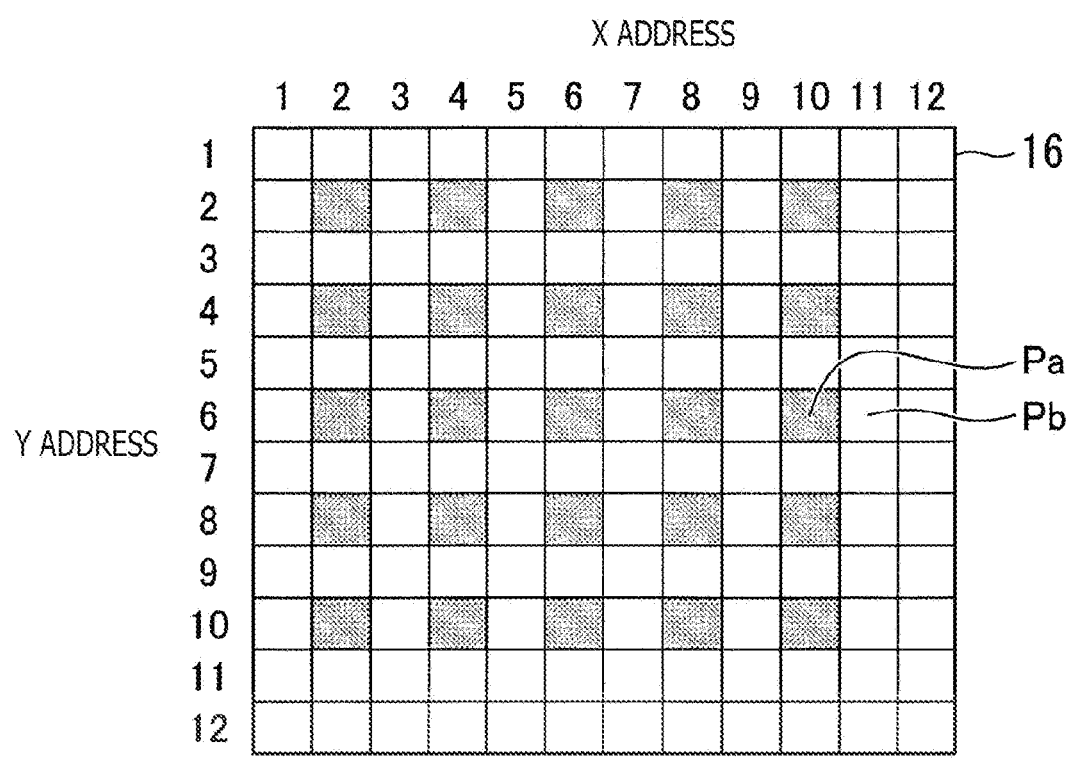
FIG. 4 is a schematic view of one example of a pixel array in which active pixels are defined.

The control section 3 defines, as active pixels Pa, 5×5=25 pixels that are positioned at addresses (X, Y)=(2, 2), (2, 4), (2, 6), (2, 8), (2, 10), (4, 2), (4, 4), (4, 6), (4, 8), (4, 10), (6, 2), (6, 4), (6, 6), (6, 8), (6, 10), (8, 2), (8, 4), (8, 6), (8, 8), (8, 10), (10, 2), (10, 4), (10, 6), (10, 8), and (10, 10) which are at equal intervals in the pixel array 16, as indicated by dot-like hatching in FIG. 4, for example. As a result, the pixels other than the multiple active pixels Pa are defined as non-active pixels Pb.

Figure 5A:
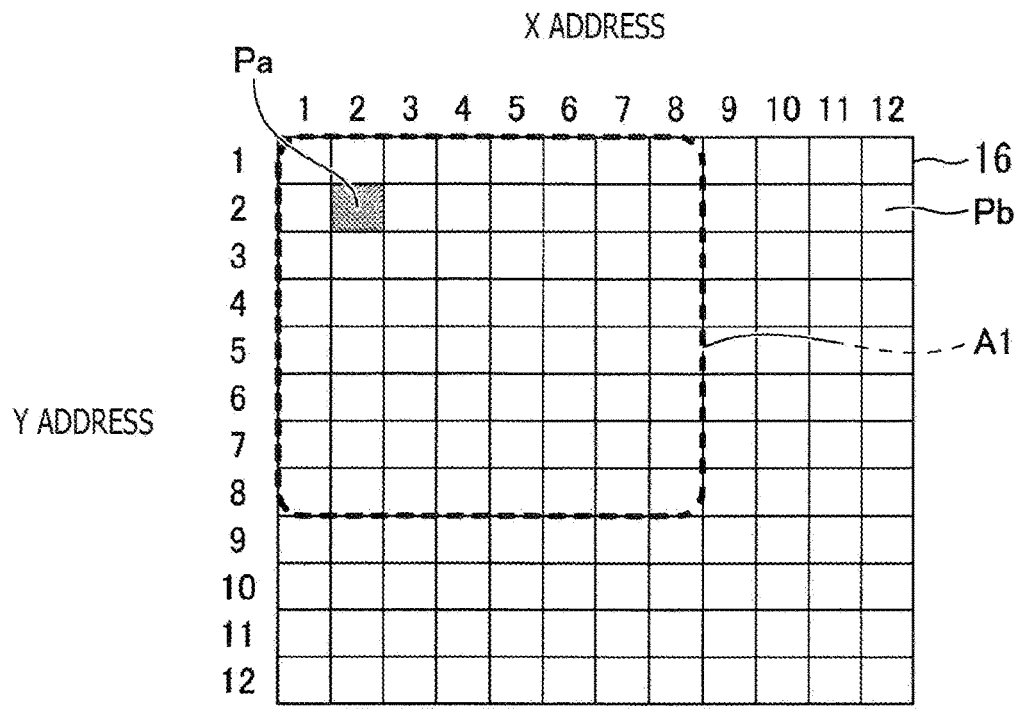
FIG. 5A is a schematic view of one example of an active pixel defining process.
Figure 5B:
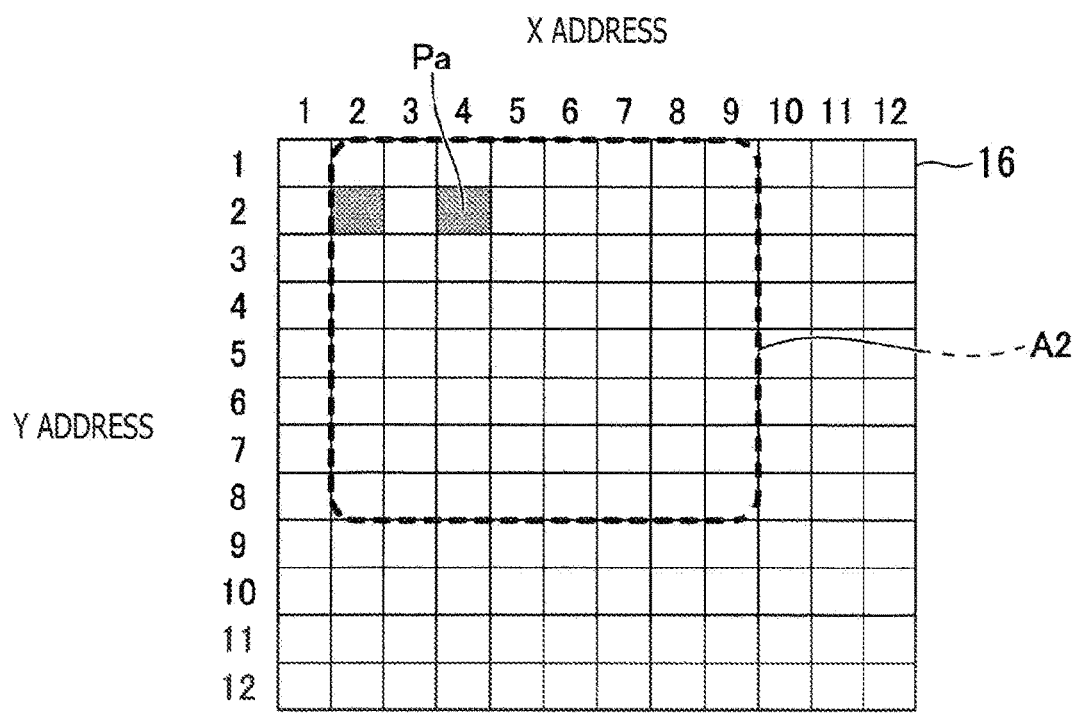
FIG. 5B is a schematic view of one example of an active pixel defining process following the process in FIG. 5A.

Here, one example of a process of defining active pixels Pa will be explained with reference to FIGS. 5A, 5B, 5C, and 5D. First, as illustrated in FIG. 5A, the control section 3 defines, as a pixel defining range A1, an 8×8 pixel region on the upper left side, and further, defines, as an active pixel Pa, a pixel at an address (2, 2) in the pixel defining range A1. In addition, as illustrated in FIG. 5B, the control section 3 defines, as a pixel defining range A2, an 8×8 pixel region that is shifted from the pixel defining range A1 to the right side in the horizontal direction (row direction) by one pixel, and further, defines, as an active pixel Pa, a pixel at an address (2, 4) in the pixel defining range A2. Here, in order to obtain the degree of freedom of the arrangement of active pixels Pa, the pixel defining ranges A1 and A2 are defined in such a way that the pixel defining ranges A1 and A2 partially overlap each other. Thereafter, the control section 3 further defines pixel defining ranges that are sequentially shifted from the pixel defining range A2 to the right side by one pixel, and defines, as active pixels Pa, pixels at addresses (2, 6), (2, 8), and (2, 10) sequentially in the respective pixel defining ranges, although an illustration of this defining is omitted.

Figure 5C:
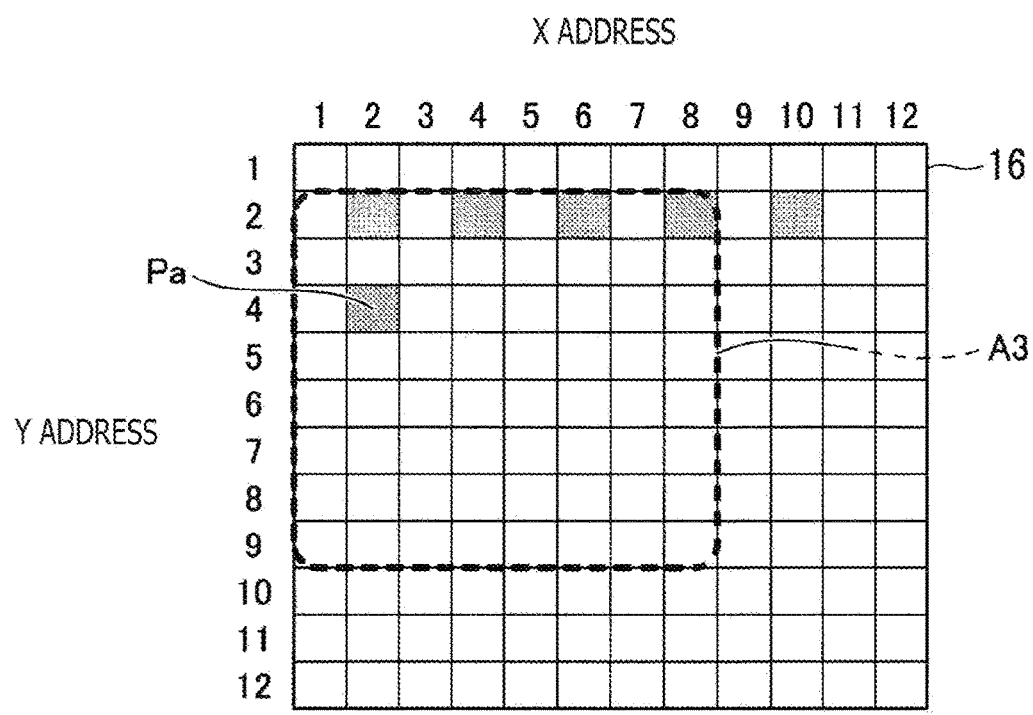
FIG. 5C is a schematic view of one example of an active pixel defining process following the process in FIG. 5B.
Figure 5D:
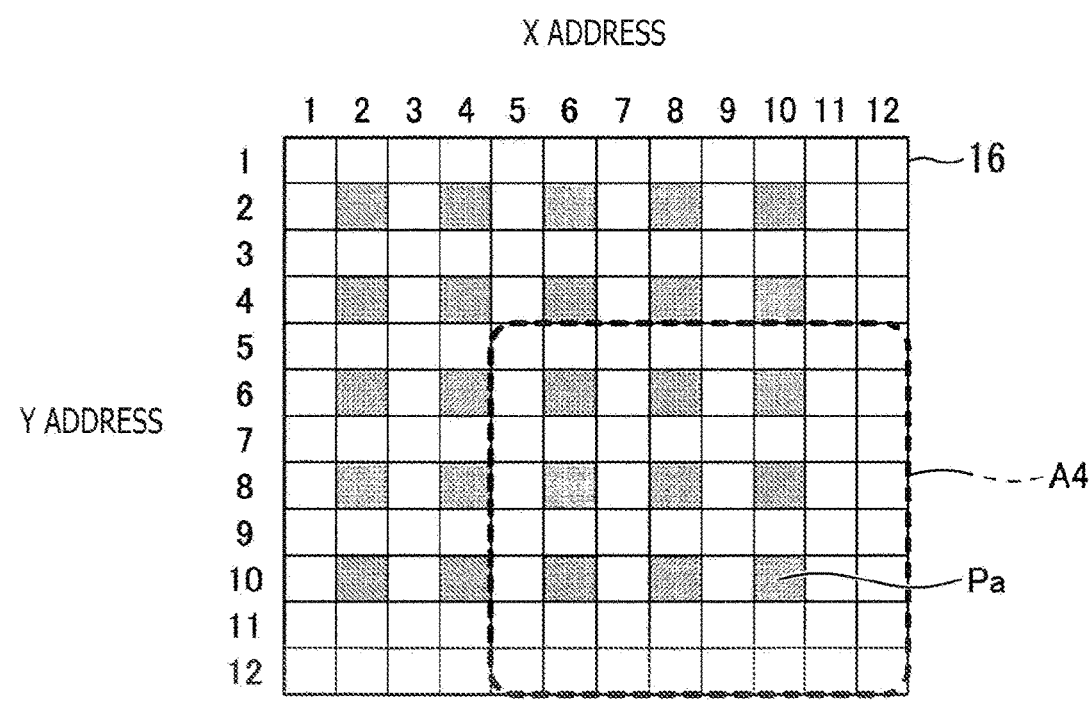
FIG. 5D is a schematic view of one example of an active pixel defining process following the process in FIG. 5C.

Further, the control section 3 defines, as a pixel defining range A3, an 8×8 pixel region that is shifted downward in the vertical direction (column direction) from the pixel defining range A1 illustrated in FIG. 5A by one pixel, and further, defines, as an active pixel Pa, a pixel at the address (4, 2) in the pixel defining range A3, as illustrated in FIG. 5C. Likewise, the control section 3 sequentially defines a pixel defining range that is shifted to the right side from the pixel defining range A3 by one pixel, and further, defines, as active pixels Pa, pixels at addresses (4, 4), (4, 6), (4, 8), and (4, 10) in the respective pixel defining ranges, although an illustration of this defining is omitted. Likewise, the pixel defining range is sequentially shifted in the horizontal direction and the vertical direction, and pixels at addresses (6, 2), (6, 4), (6, 6), (6, 8), (6, 10), (8, 2), (8, 4), (8, 6), (8, 8), (8, 10), (10, 2), (10, 4), (10, 6), and (10, 8) in the respective pixel defining ranges are defined as active pixels Pa. At the end of the sequential shifting, the control section 3 defines, as a pixel defining range A4, an 8×8 pixel region on the lower right side, and further, defines, as an active pixel Pa, a pixel at an address (10, 10) in the pixel defining range A4, as illustrated in FIG. 5D.

It is to be noted that a range to be defined as a pixel defining range and the number of the pixel defining ranges in the pixel array 16 are not limited to those illustrated in FIGS. 5A, 5B, 5C, and 5D. In addition, the position of an active pixel Pa that is defined in each pixel defining range is also not limited to that illustrated in FIGS. 5A, 5B, 5C, and 5D.

Figure 6A:
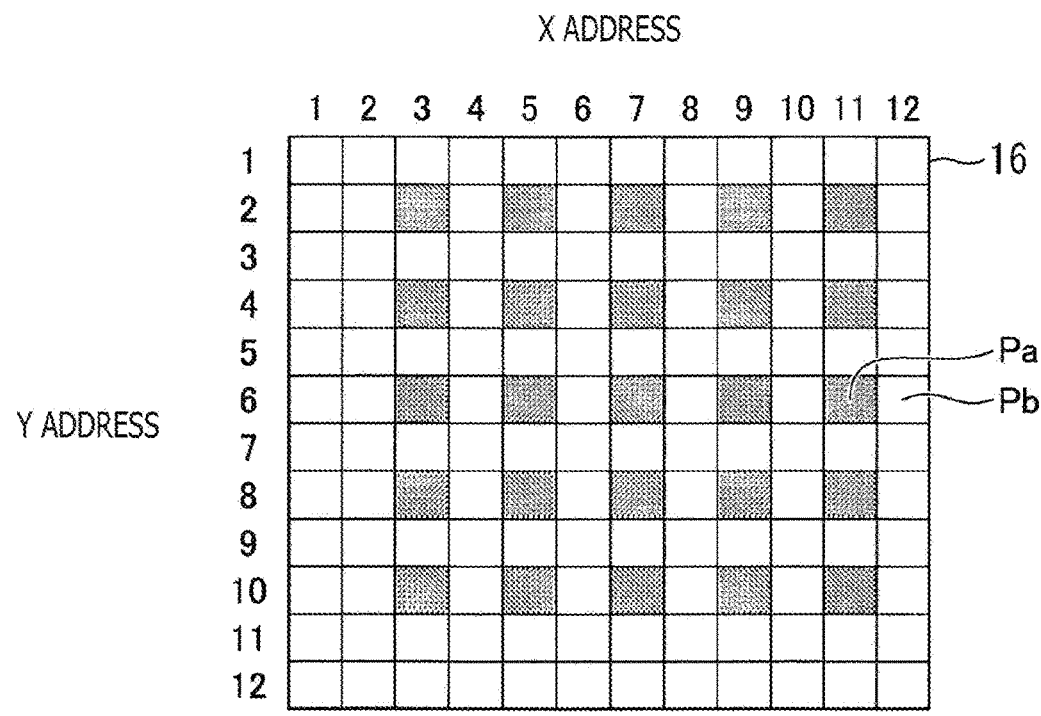
FIG. 6A is a schematic view of another example of the pixel array in which active pixels are defined.
Figure 6B:
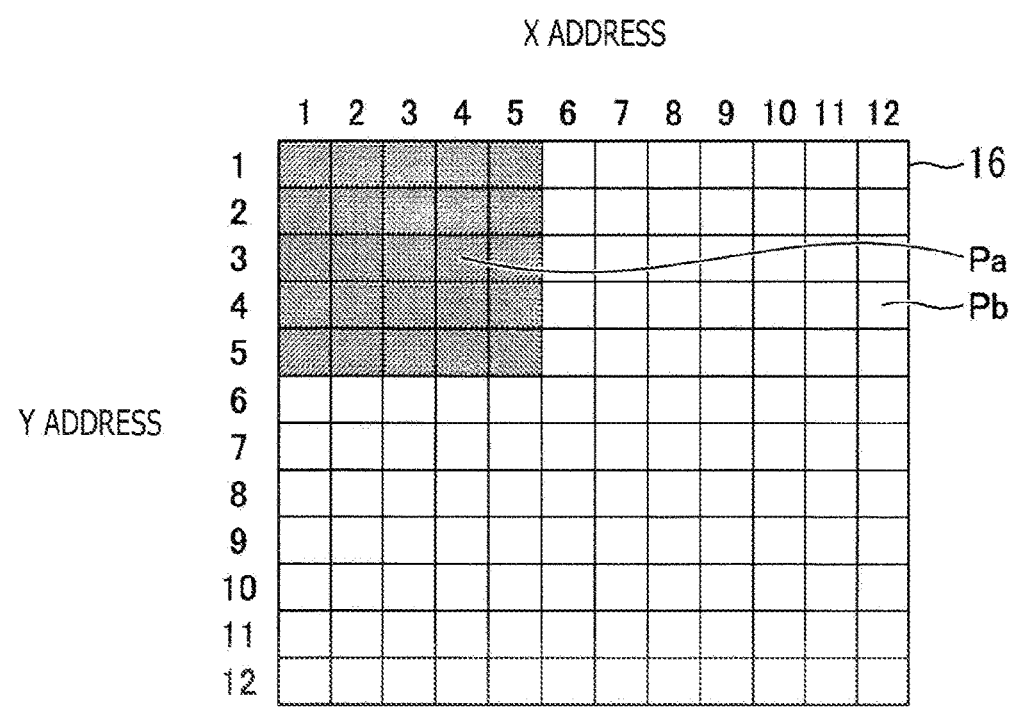
FIG. 6B is a schematic view of still another example of the pixel array in which active pixels are defined.

For example, by using the pixel defining ranges obtained by shifting an 8×8 pixel region by one pixel as illustrated in FIGS. 5A, 5B, 5C, and 5D, the control section 3 may define active pixels Pa (indicated by dot-like hatching in the drawing), which are shifted from the respective active pixels Pa illustrated in FIG. 4b to the right side in the horizontal direction by one pixel, and further, may define, as non-active pixels Pb, the pixels other than the active pixels Pa, as illustrated in FIG. 6A. Further, by using the pixel defining ranges obtained by shifting an 8×8 pixel region by one pixel, as illustrated in FIGS. 5A, 5B, 5C, and 5D, the control section 3 may define 5×5 pixels on the upper left side as active pixels Pa (indicated by dot-like hatching in the drawing), with high density, and further, may define, as non-active pixels Pb, the pixels other than the active pixels Pa, as illustrated in FIG. 6B.

After once defining the multiple pixels constituting the pixel array 16 as active pixels Pa and non-active pixels Pb, the control section 3 may perform switching between the active pixels Pa and the non-active pixels Pb by outputting a control signal to the selection section 17. For example, after defining active pixels Pa and non-active pixels Pb as illustrated in FIG. 4, the control section 3 may perform switching to define active pixels Pa and non-active pixels Pb as illustrated in FIG. 6A.

Selection Section According to Comparative Example of First Embodiment

Figure 7:
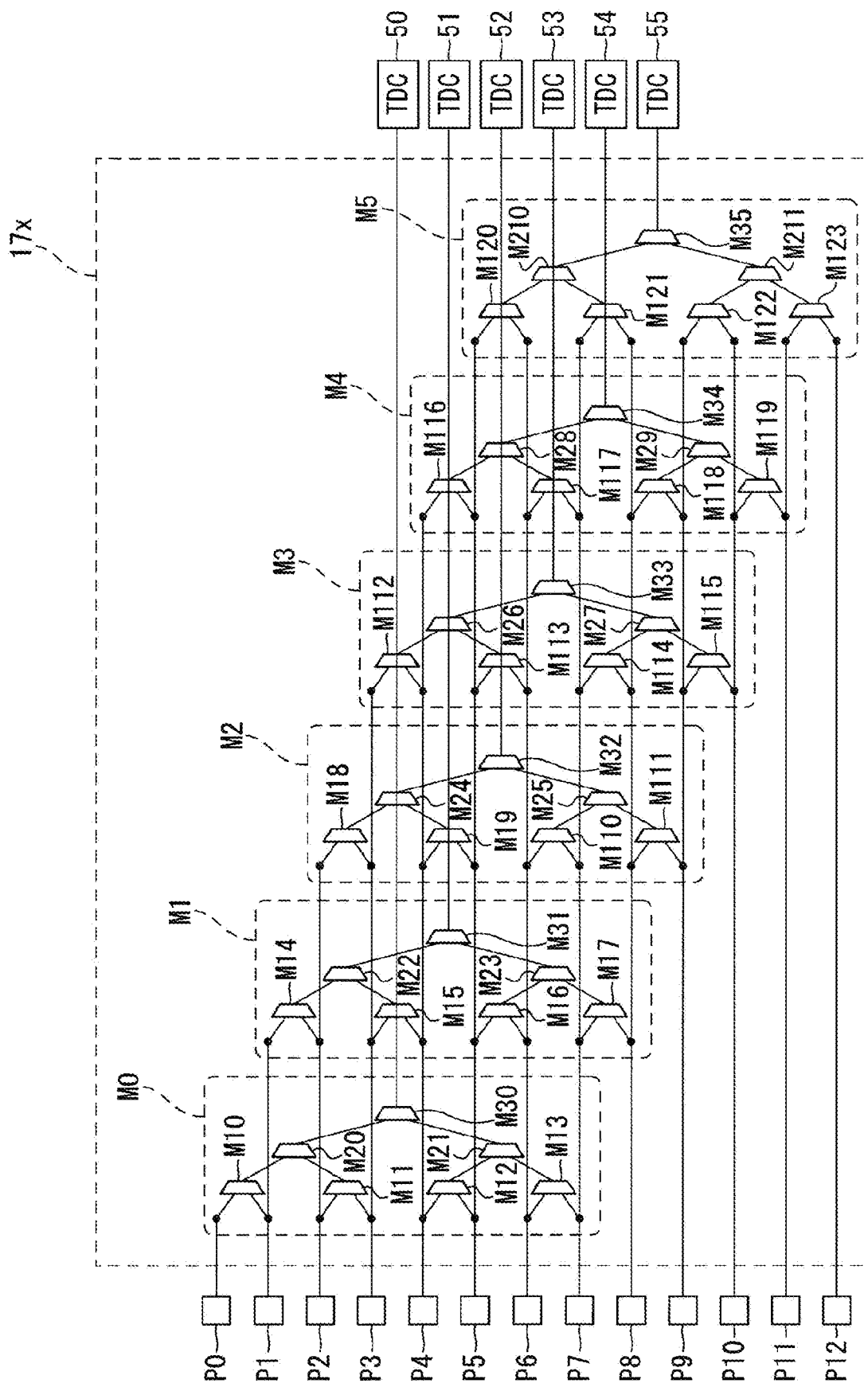
FIG. 7 is a schematic view of a selection section according to a comparative example of the first embodiment of the present technology.

Next, prior to a detailed explanation of the selection section 17 according to the first embodiment illustrated in FIG. 3, a selection section 17x according to a comparative example of the first embodiment will be explained with reference to FIG. 7. For convenience of illustration, FIG. 7 illustrates a case where the selection section 17x according to the comparative example connects 13 pixels P0 to P12 defined in the pixel array 16 of the light receiving section 2, to six time measuring circuits (TDC) 50 to 55. However, the number of the pixels P0 to P12 and the number of the time measuring circuits 50 to 55 are not limited to those in this case. The selection section 17x according to the comparative example includes six selection circuits M0 to M5 the output sides of which are respectively connected to the six time measuring circuits (TDC) 50 to 55.

The selection circuit M0 selects any one of signals outputted from eight pixels P0 to P7 and outputs the selected signal to the time measuring circuits 50. That is, a range consisting of the eight pixels P0 to P7 is defined as a pixel defining range, an active pixel from among the pixels P0 to P7 is defined in the pixel defining range, and a signal outputted from the active pixel is selected by the selection circuit M0. The selection circuit M0 includes first-stage multiplexers M10, M11, M12, and M13, second-stage multiplexers M20 and M21, and a third-stage multiplexer M30. The input side of the first-stage multiplexer M10 is connected to the pixels P0 and P1, and the output side of the first-stage multiplexer M10 is connected to the input side of the second-stage multiplexer M20. The first-stage multiplexer M10 performs a multiplexing process of selecting either a signal outputted from the pixel P0 or a signal outputted from the pixel P1 and outputting the selected signal to the second-stage multiplexer M20.

The input side of the first-stage multiplexer M11 is connected to the pixels P2 and P3, and the output side of the first-stage multiplexer M11 is connected to the input side of the second-stage multiplexer M20. The first-stage multiplexer M11 performs a multiplexing process of selecting either a signal outputted from the pixel P2 or a signal outputted from the pixel P3 and outputting the selected signal to the second-stage multiplexer M20.

Also, the input side of the first-stage multiplexer M12 is connected to the pixels P4 and P5, and the output side of the first-stage multiplexer M12 is connected to the input side of the second-stage multiplexer M21. The first-stage multiplexer M12 performs a multiplexing process of selecting either a signal outputted from the pixel P4 or a signal outputted from the pixel P5 and outputting the selected signal to the second-stage multiplexer M21.

Also, the input side of the first-stage multiplexer M13 is connected to the pixels P6 and P7, and the output side of the first-stage multiplexer M13 is connected to the input side of the second-stage multiplexer M21. The first-stage multiplexer M13 performs a multiplexing process of selecting either a signal outputted from the pixel P6 or a signal outputted from the pixel P7 and outputting the selected signal to the second-stage multiplexer M21.

Also, the input side of the second-stage multiplexer M20 is connected to the output sides of the first-stage multiplexers M10 and M11, and the output side of the second-stage multiplexer M20 is connected to the input side of the third-stage multiplexer M30. The second-stage multiplexer M20 performs a multiplexing process of selecting either the one signal selected and outputted by the first-stage multiplexer M10 or the one signal selected and outputted by the first-stage multiplexer M11 and outputting the selected signal to the third-stage multiplexer M30.

Also, the input side of the second-stage multiplexer M21 is connected to the output sides of the first-stage multiplexers M12 and M13, and the output side of the second-stage multiplexer M21 is connected to the input side of the third-stage multiplexer M30. The second-stage multiplexer M21 performs a multiplexing process of selecting either the one signal selected and outputted by the first-stage multiplexer M12 or the one signal selected and outputted by the first-stage multiplexer M13 and outputting the selected signal to the third-stage multiplexer M30.

Also, the input side of the third-stage multiplexer M30 is connected to the output sides of the second-stage multiplexers M20 and M21, and the output side of the third-stage multiplexer M30 is connected to the time measuring circuit 50. The third-stage multiplexer M30 performs a multiplexing process of selecting either the one signal selected and outputted by the second-stage multiplexer M20 or the one signal selected and outputted by the second-stage multiplexer M21 and outputting the selected signal to the time measuring circuit 50.

The selection circuit M1 selects any one of signals outputted from eight pixels P1 to P8 and outputs the selected signal to the time measuring circuit 51. That is, a region consisting of the eight pixels P1 to P8 is defined as a pixel defining range, an active pixel from among the pixels P1 to P8 is defined in the pixel defining range, and a signal outputted from the active pixel is selected by the selection circuit M1. The selection circuit M1 includes first-stage multiplexers M14, M15, M16, and M17, second-stage multiplexers M22 and M23, and a third-stage multiplexer M31. The circuit configuration of the selection circuit M1 is similar to that of the selection circuit M0, and thus, a redundant explanation thereof is omitted.

The selection circuit M2 selects any one of signals outputted from eight pixels P2 to P9 and outputs the selected signal to the time measuring circuit 52. That is, a region consisting of the eight pixels P2 to P9 is defined as a pixel defining range, an active pixel from among the pixels P2 to P9 is defined in the pixel defining range, and a signal outputted from the active pixel is selected by the selection circuit M2. The selection circuit M2 includes first-stage multiplexers M18, M19, M110, and M111, second-stage multiplexers M24 and M25, and a third-stage multiplexer M32. The circuit configuration of the selection circuit M2 is similar to that of the selection circuit M0, and thus, a redundant explanation thereof is omitted.

The selection circuit M3 selects any one of signals outputted from eight pixels P3 to P10 and outputs the selected signal to the time measuring circuit 53. That is, a region consisting of the eight pixels P3 to P10 is defined as a pixel defining range, an active pixel from among the pixels P3 to P10 is defined in the pixel defining range, and a signal outputted from the active pixel is selected by the selection circuit M3. The selection circuit M3 includes first-stage multiplexers M112, M113, M114, and M115, second-stage multiplexers M26 and M27, and a third-stage multiplexer M33. The circuit configuration of the selection circuit M3 is similar to that of the selection circuit M0, and thus, a redundant explanation thereof is omitted.

The selection circuit M4 selects any one of signals outputted from eight pixels P4 to P11 and outputs the selected signal to the time measuring circuit 54. That is, a region consisting of the eight pixels P4 to P11 is defined as a pixel defining range, an active pixel from among the pixels P4 to P11 is defined in the pixel defining range, and a signal outputted from the active pixel is selected by the selection circuit M4. The selection circuit M4 includes first-stage multiplexers M116, M117, M118, and M119, second-stage multiplexers M28 and M29, and a third-stage multiplexer M34. The circuit configuration of the selection circuit M4 is similar to that of the selection circuit M0, and thus, a redundant explanation thereof is omitted.

The selection circuit M5 selects any one of signals outputted from eight pixels P5 to P12 and outputs the selected signal to the time measuring circuit 55. That is, a region consisting of the eight pixels P5 to P12 is defined as a pixel defining range, an active pixel from among the pixels P5 to P12 is defined in the pixel defining range, and a signal outputted from the active pixel is selected by the selection circuit M5. The selection circuit M5 includes first-stage multiplexers M120, M121, M122, and M123, second-stage multiplexers M210 and M211, and a third-stage multiplexer M35. The circuit configuration of the selection circuit M5 is similar to that of the selection circuit M0, and thus, a redundant explanation thereof is omitted.

With the selection section 17x according to the comparative example illustrated in FIG. 7, the selection circuits M0 to M5 can select signals outputted from pixels defined as active pixels among the pixels P0 to P12 and can output the selected signals to the time measuring circuits 50 to 55, respectively. However, in order to obtain the degree of freedom of the arrangement of active pixels, the selection section 17x according to the comparative example includes the selection circuits M0 to M5 each formed of seven multiplexers in such a way that the respective pixel defining ranges of the active pixels overlap each other. Accordingly, a total of 42 multiplexers are necessary. Consequently, the circuit scale is increased, and signal paths are extended, so that timing skew between pixels is likely to be increased.

Selection Section According to First Embodiment

Figure 8A:
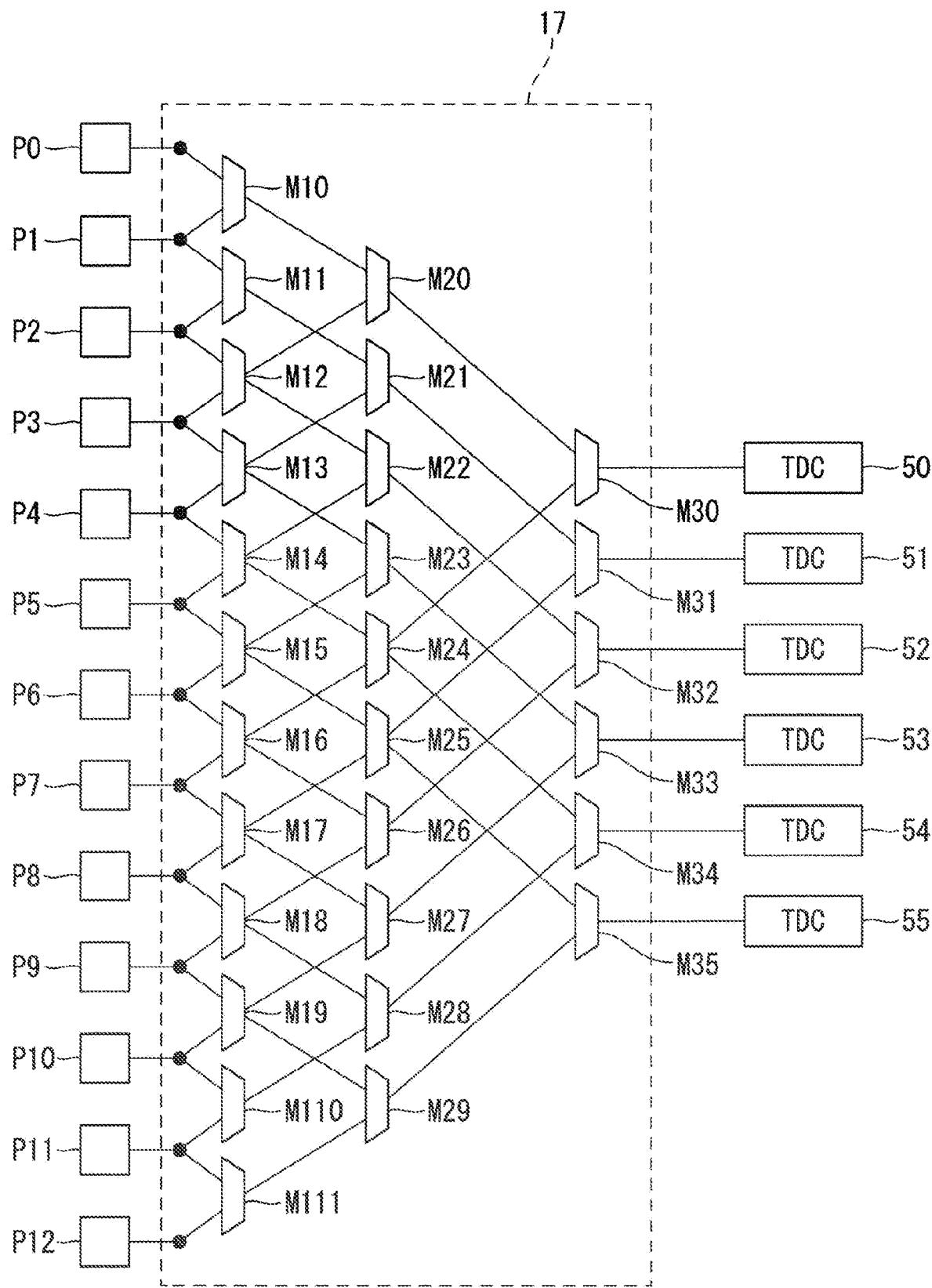
FIG. 8A is a schematic view of a selection section according to the first embodiment of the present technology.

In contrast, FIG. 8A illustrates the selection section 17 according to the first embodiment of the present technology. FIG. 8A illustrates a case where, as with the selection section 17x according to the comparative example illustrated in FIG. 7, the selection section 17 according to the first embodiment connects 13 pixels P0 to P12 which are defined in the pixel array 16 of the light receiving section 2, to six time measuring circuits (TDC) 50 to 55.

The selection section 17 according to the first embodiment of the present technology includes first-stage multiplexers M10, M11, M12, M13, M14, M15, M16, M17, M18, M19, M110, and M111, second-stage multiplexers M20, M21, M22, M23, M24, M25, M26, M27, M28, and M29, and third-stage multiplexers M30, M31, M32, M33, M34, and M35. The first-stage multiplexers M10 to M111, the second-stage multiplexers M20 to M29, and the third-stage multiplexers M30 to M35 are each connected to the control section 3 illustrated in FIG. 1, and are each operated according to a control signal from the control section 3.

The input side of the first-stage multiplexer M10 is connected to the pixels P0 and P1, and the output side of the first-stage multiplexer M10 is connected to the second-stage multiplexer M20. The first-stage multiplexer M10 performs a multiplexing process of selecting either a signal outputted from the pixel P0 or a signal outputted from the pixel P1 and outputting the selected signal to the second-stage multiplexer M20.

Also, the input side of the first-stage multiplexer M11 is connected to the pixels P1 and P2, and the output side of the first-stage multiplexer M11 is connected to the second-stage multiplexer M21. The first-stage multiplexer M11 performs a multiplexing process of selecting either a signal outputted from the pixel P1 or a signal outputted from the pixel P2 and outputting the selected signal to the second-stage multiplexer M21.

Also, the input side of the first-stage multiplexer M12 is connected to the pixels P2 and P3, and the output side of the first-stage multiplexer M12 is connected to both the second-stage multiplexers M20 and M22. The first-stage multiplexer M12 performs a multiplexing process of selecting either a signal outputted from the pixel P2 or a signal outputted from the pixel P3 and outputting the selected signal to the second-stage multiplexers M20 and M22.

Also, the input side of the first-stage multiplexer M13 is connected to the pixels P3 and P4, and the output side of the first-stage multiplexer M13 is connected to both the second-stage multiplexers M21 and M23. The first-stage multiplexer M13 performs a multiplexing process of selecting either a signal outputted from the pixel P3 or a signal outputted from the pixel P4 and outputting the selected signal to the second-stage multiplexers M21 and M23.

Also, the input side of the first-stage multiplexer M14 is connected to the pixels P4 and P5, and the output side of the first-stage multiplexer M14 is connected to both the second-stage multiplexers M22 and M24. The first-stage multiplexer M14 performs a multiplexing process of selecting either a signal outputted from the pixel P4 or a signal outputted from the pixel P5 and outputting the selected signal to the second-stage multiplexers M22 and M24. The circuit configurations of the first-stage multiplexers M15 to M111 are similar to those of the first-stage multiplexers M10 to M14, and thus, a redundant explanation thereof is omitted.

The input side of the second-stage multiplexer M20 is connected to the first-stage multiplexers M10 and M12, and the output side of the second-stage multiplexer M20 is connected to the third-stage multiplexer M30. The second-stage multiplexer M20 performs a multiplexing process of selecting either the one signal selected and outputted by the first-stage multiplexer M10 or the one signal selected and outputted by the first-stage multiplexer M12 and outputting the selected signal to the third-stage multiplexer M30.

Also, the input side of the second-stage multiplexer M21 is connected to the first-stage multiplexers M11 and M13, and the output side of the second-stage multiplexer M21 is connected to the third-stage multiplexer M31. The second-stage multiplexer M21 performs a multiplexing process of selecting either the one signal selected and outputted by the first-stage multiplexer M11 or the one signal selected and outputted by the first-stage multiplexer M13 and outputting the selected signal to the third-stage multiplexer M31.

Also, the input side of the second-stage multiplexer 22 is connected to the first-stage multiplexers M12 and M14, and the output side of the second-stage multiplexer M22 is connected to the third-stage multiplexer M32. The second-stage multiplexer M22 performs a multiplexing process of selecting either the one signal selected and outputted by the first-stage multiplexer M12 or the one signal selected and outputted by the first-stage multiplexer M14 and outputting the selected signal to the third-stage multiplexer M32.

Also, the input side of the second-stage multiplexer M23 is connected to the first-stage multiplexers M13 and M15, and the output side of the second-stage multiplexer M23 is connected to the third-stage multiplexer M33. The second-stage multiplexer M22 performs a multiplexing process of selecting either the one signal selected and outputted by the first-stage multiplexer M13 or the one signal selected and outputted by the first-stage multiplexer M15 and outputting the selected signal to the third-stage multiplexer M33.

Also, the input side of the second-stage multiplexer M24 is connected to the first-stage multiplexers M14 and M16, and the output side of the second-stage multiplexer M24 is connected to both the third-stage multiplexers M30 and M34. The second-stage multiplexer M24 performs a multiplexing process of selecting either the one signal selected and outputted by the first-stage multiplexer M14 or the one signal selected and outputted by the first-stage multiplexer M16 and outputting the selected signal to the third-stage multiplexers M30 and 34. The circuit configurations of the second-stage multiplexers M25 to M29 are similar to those of the second-stage multiplexers M20 to M24, and thus, a redundant explanation thereof is omitted.

The input side of the third-stage multiplexer M30 is connected to the second-stage multiplexers M20 and M24, and the output side of the third-stage multiplexer M30 is connected to the time measuring circuit 50. The third-stage multiplexer M30 performs a multiplexing process of selecting either the one signal selected and outputted by the second-stage multiplexer M20 or the one signal selected and outputted by the second-stage multiplexer M24 and outputting the selected signal to the time measuring circuit 50.

Also, the input side of the third-stage multiplexer M31 is connected to the second-stage multiplexers M21 and M25, and the output side of the third-stage multiplexer M31 is connected to the time measuring circuit 51. The third-stage multiplexer M31 performs a multiplexing process of selecting either the one signal selected and outputted by the second-stage multiplexer M21 or the one signal selected and outputted by the second-stage multiplexer M25 and outputting the selected signal to the time measuring circuit 51.

Also, the input side of the third-stage multiplexer M32 is connected to the second-stage multiplexers M22 and M26, and the output side of the third-stage multiplexer M32 is connected to the time measuring circuit 52. The third-stage multiplexer M32 performs a multiplexing process of selecting either the one signal selected and outputted by the second-stage multiplexer M22 or the one signal selected and outputted by the second-stage multiplexer M26 and outputting the selected signal to the time measuring circuit 52. The circuit configurations of the third-stage multiplexers M33 to M35 are similar to those of the third-stage multiplexers M30 to M32, and thus, a redundant explanation thereof is omitted.

In the selection section 17 according to the first embodiment of the present technology, the multiplexers, for which the pixel defining ranges overlap each other in the selection section 17x according to the comparative example illustrated in FIG. 7, are adaptable to sharing usage. That is, by modifying the two first-stage multiplexers M11 and M18 in the selection section 17x according to the comparative example illustrated in FIG. 7 so as to be adaptable to sharing usage, the single first-stage multiplexer M12 in the selection section 17 according to the first embodiment illustrated in FIG. 8A is obtained. In addition, by modifying the two first-stage multiplexers M15 and M112 of the selection section 17x according to the comparative example illustrated in FIG. 7 so as to be adaptable to sharing usage, the single first-stage multiplexer M13 of the selection section 17 according to the first embodiment illustrated in FIG. 8A is obtained.

Also, by modifying the three first-stage multiplexers M12, M19, and M116 of the selection section 17x according to the comparative example illustrated in FIG. 7 so as to be adaptable to sharing usage, the single first-stage multiplexer M14 of the selection section 17 according to the first embodiment illustrated in FIG. 8A is obtained. Also, by modifying the three first-stage multiplexers M16, M113, and M120 of the selection section 17x according to the comparative example illustrated in FIG. 7 so as to be adaptable to sharing usage, the single first-stage multiplexer M15 of the selection section 17 according to the first embodiment illustrated in FIG. 8A is obtained. Also, by modifying the three first-stage multiplexers M13, M110, and M117 of the selection section 17x according to the comparative example illustrated in FIG. 7 so as to be adaptable to sharing usage, the single first-stage multiplexer M16 of the selection section 17 according to the first embodiment illustrated in FIG. 8A is obtained. Also, by modifying the three first-stage multiplexers M17, M114, M121 of the selection section 17x according to the comparative example illustrated in FIG. 7 so as to be adaptable to sharing usage, the single first-stage multiplexer M17 of the selection section 17 according to the first embodiment illustrated in FIG. 8A is obtained.

Also, by modifying the two first-stage multiplexers M111 and M118 of the selection section 17x according to the comparative example illustrated in FIG. 7 so as to be adaptable to sharing usage, the single first-stage multiplexer M18 of the selection section 17 according to the first embodiment illustrated in FIG. 8A is obtained. Also, by modifying the two first-stage multiplexers M115 and M122 of the selection section 17x according to the comparative example illustrated in FIG. 7 so as to be adaptable to sharing usage, the single first-stage multiplexer M19 of the selection section 17 according to the first embodiment illustrated in FIG. 8A is obtained.

Also, by modifying the two second-stage multiplexers M21 and M28 of the selection section 17x according to the comparative example illustrated in FIG. 7 so as to be adaptable to sharing usage, the single second-stage multiplexer M24 of the selection section 17 according to the first embodiment illustrated in FIG. 8A is obtained. Also, by modifying the two second-stage multiplexers M23 and M210 of the selection section 17x according to the comparative example illustrated in FIG. 7 so as to be adaptable to sharing usage, the single second-stage multiplexer M25 of the selection section 17 according to the first embodiment illustrated in FIG. 8A is obtained.

Accordingly, the selection section 17 according to the first embodiment illustrated in FIG. 8A can be formed of a total of 28 multiplexers. Therefore, the circuit scale can be reduced, and timing skew can be improved, compared to the selection section 17x according to the comparative example illustrated in FIG. 7.

In addition, since the multiplexers are set to be adaptable to sharing usage, the selection section 17 according to the first embodiment illustrated in FIG. 8A is subjected to a constraint that two inputs cannot be simultaneously used at a multiplexer modified for sharing usage. However, if the time measuring circuits 50 to 55 are properly connected, any arrangement of active pixels can be realized. Accordingly, the same degree of freedom can be obtained in terms of the functions.

Figure 8B:
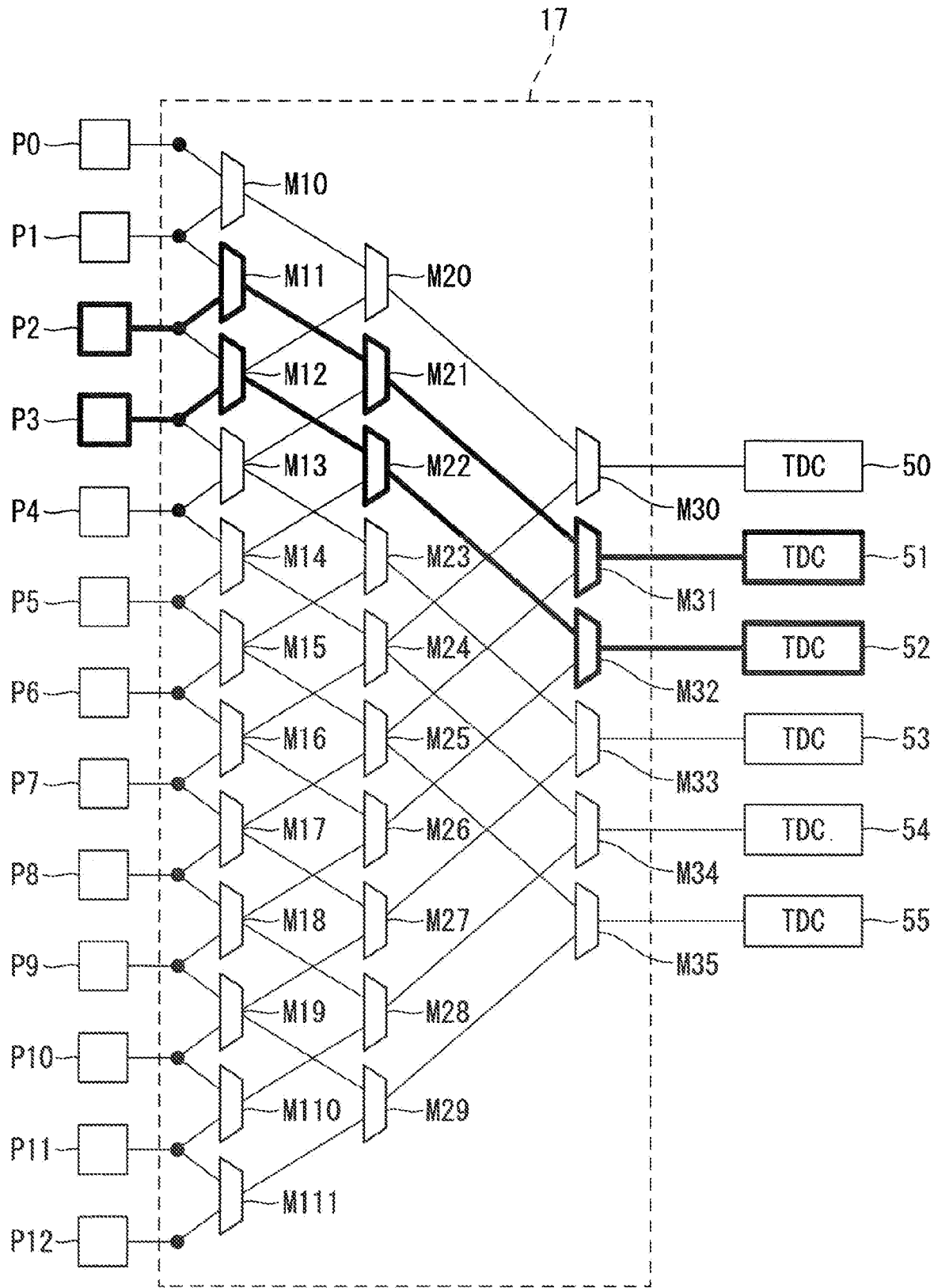
FIG. 8B is a schematic view of one operation example of the selection section illustrated in FIG. 8A.

For example, it is assumed that the selection section 17 according to the first embodiment is used to define the pixels P2 and P3 as active pixels, as illustrated in FIG. 8B. In FIG. 8B, selected paths from the pixels P2 and P3 to the time measuring circuits 51 and 52 are highlighted with thick lines. A signal outputted by the pixel P2 is selected by the first-stage multiplexer M11, the second-stage multiplexer M21, and the third-stage multiplexer M31, and is outputted to the time measuring circuit 51. A signal outputted by the pixel P3 is selected by the first-stage multiplexer M12, the second-stage multiplexer M22, and the third-stage multiplexer M32, and is outputted to the time measuring circuit 52. In such a manner, in a case where the pixels P2 and P3 are defined as active pixels, the pixels P2 and P3 cannot be connected to the time measuring circuits 50 and 52, respectively, but can be connected to the time measuring circuits 51 and 52, respectively.

Figure 9:
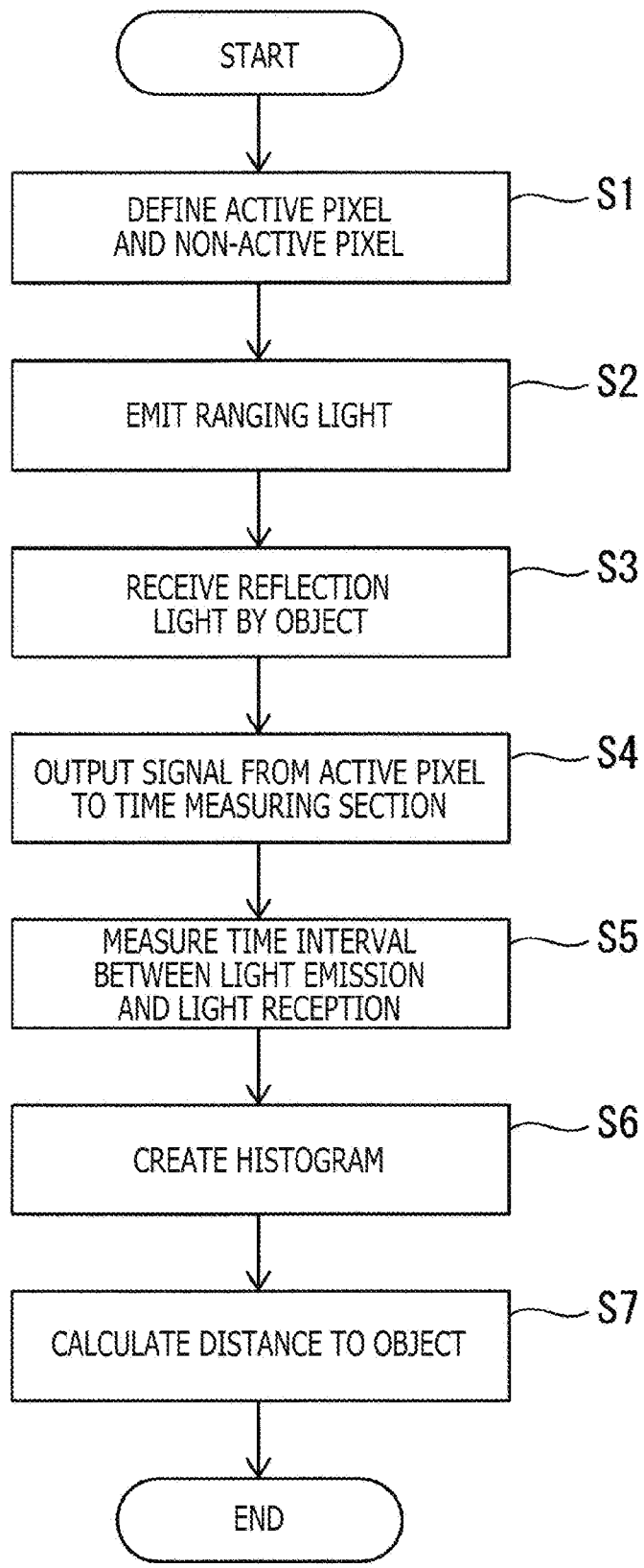
FIG. 9 is a flowchart of a ranging method according to the first embodiment of the present technology.

Next, one example of a ranging method according to the first embodiment including a light receiving method which is performed by the light receiving device 10 according to the first embodiment will be explained with reference to a flowchart in FIG. 9.

In step S1, the control section 3 illustrated in FIG. 1 defines multiple pixels constituting the pixel array 16 in the light receiving section 2, as active pixels and non-active pixels. In order to, for example, correct an optical displacement during manufacturing and assembling, the control section 3 defines, among the multiple pixels constituting the pixel array 16 in the light receiving section 2, pixels that can properly receive the reflection light L2 as active pixels, and defines the pixels other than the active pixels as non-active pixels.

In step S2, the light emitting section 1 emits the ranging light L1. In step S3, the light receiving section 2 receives the ranging light L2. In step S4, the control section 3 causes signals outputted from pixels defined as the active pixels in step S1 to be outputted from the light receiving section 2 to the time measuring section 5.

In steps S5 to S7, on the basis of a timing of emission of the light L1 from the light source 11 and a timing of reception of the reflection light L2 at the light receiving section 2, the ranging processing section 4 calculates the distance to the object 20. That is, in step S5, the time measuring section 5 converts a time interval (time of arrival) between the emission of the light L1 from the light source 11 in step S2 and the reception of the reflection light L2 at a pixel in step S3 to a digital value, on the basis of a trigger pulse transmitted from the control section 3 in order to drive the light source 11 and of an electric pulse signal transmitted from the light receiving section 2. In step S6, the histogram creating section 6 creates a histogram by performing accumulation based on the digital values obtained by the conversion at the time measuring section 5. In step S7, by referring to the histograms created by the histogram creating section 6, the distance calculating section 7 detects the peak values (digital values) in the respective histograms and calculates the distance to the object 20 from the times of arrival corresponding to the detected peak values (digital values).

Effects of First Embodiment

In the ranging system and the light receiving device 10 according to the first embodiment, the control section 3 defines the multiple pixels in the pixel array 16 of the light receiving section 2 as active pixels and non-active pixels, as explained so far. Further, signals outputted from the pixels defined as the active pixels are outputted from the light receiving section 2. Accordingly, an optical displacement such as an aberration or a magnification in a light spot during manufacturing and assembling, etc. can be corrected.

Moreover, since the selection section 17 according to the first embodiment illustrated in FIG. 8A is provided, switching between an active pixel and a non-active pixel can be properly performed. In addition, the circuit scale can be reduced, and timing skew can be improved, compared to the selection section 17x according to the comparative example illustrated in FIG. 7. It is to be noted that, although the case where the 12 pixels P0 to P12 and the six time measuring circuits 50 to 55 are provided is illustrated in FIG. 8A, the number of the pixels P0 to P12 and the number of the time measuring circuits 50 to 55 are not limited those in this case. The circuit scale of the selection section 17 according to the first embodiment illustrated in FIG. 8A may be increased or reduced according to an increase or a decrease in the number of the pixels P0 to P12 or the number of the time measuring circuits 50 to 55.

First Modification of First Embodiment

Figure 10A:
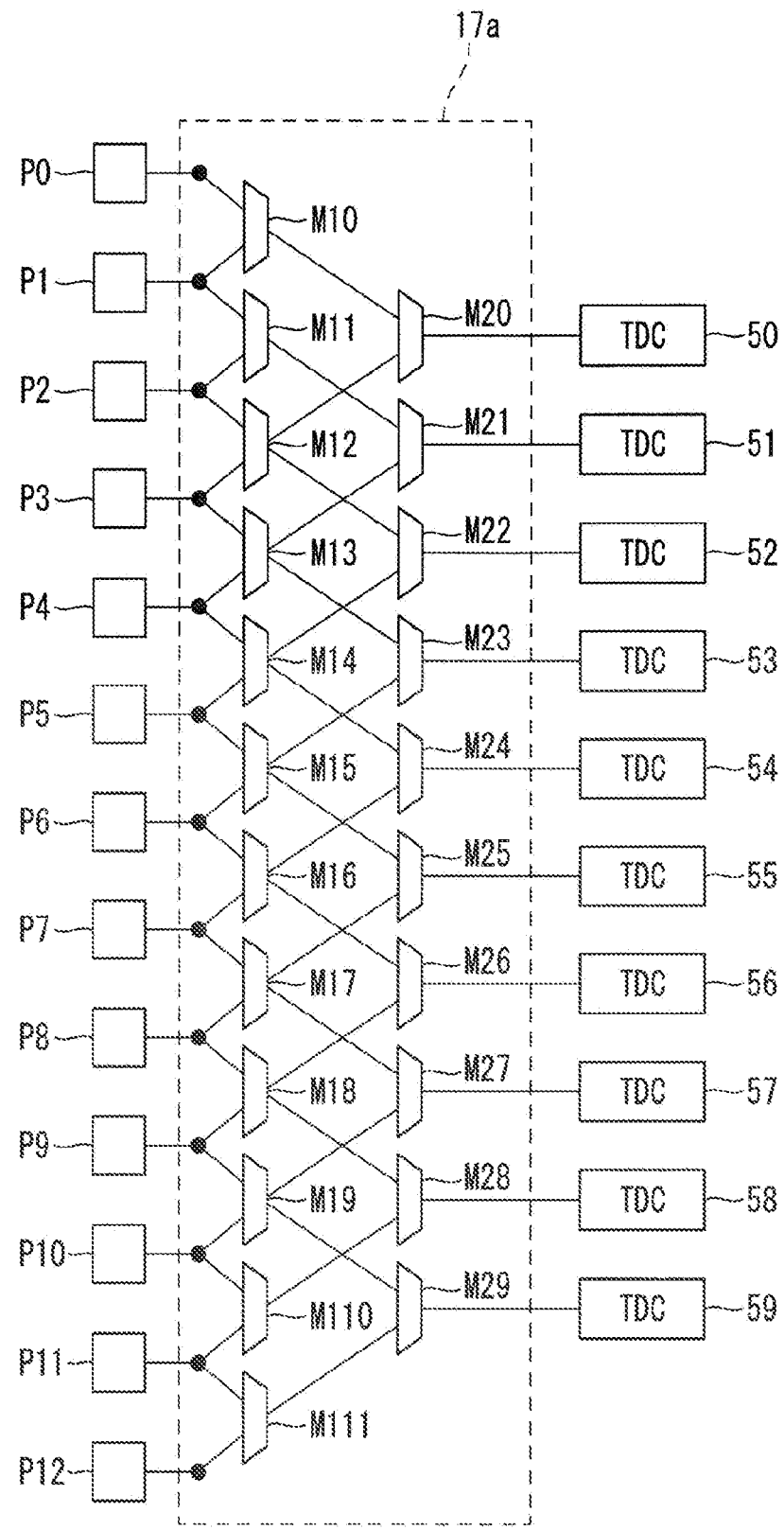
FIG. 10A is a schematic view of one example of a selection section according to a first modification of the first embodiment of the present technology.

As illustrated in FIG. 10A, a selection section 17a according to a first modification of the first embodiment of the present technology includes the first-stage multiplexers M10, M11, M12, M13, M14, M15, M16, M17, M18, M19, M110, and M111, and the second-stage multiplexers M20, M21, M22, M23, M24, M25, M26, M27, M28, and M29, as in the selection section 17 according to the first embodiment illustrated in FIG. 8A. However, unlike the selection section 17 according to the first embodiment illustrated in FIG. 8A, the selection section 17a according to the first modification includes no third-stage multiplexer.

As illustrated in FIG. 10A, the second-stage multiplexers M20 to M29 in the selection section 17a are respectively connected to 10 time measuring circuits (TDC) 50 to 59. The selection section 17a according to the first modification can be formed of a total of 22 multiplexers. According to the first modification of the first embodiment of the present technology, the selection section 17a can have a two-stage configuration, and further, the number of the time measuring circuits 50 to 59 can be selected as appropriate. It is to be noted that the selection section may be formed of multiplexers of four or more stages.

Second Modification of First Embodiment

Figure 10B:
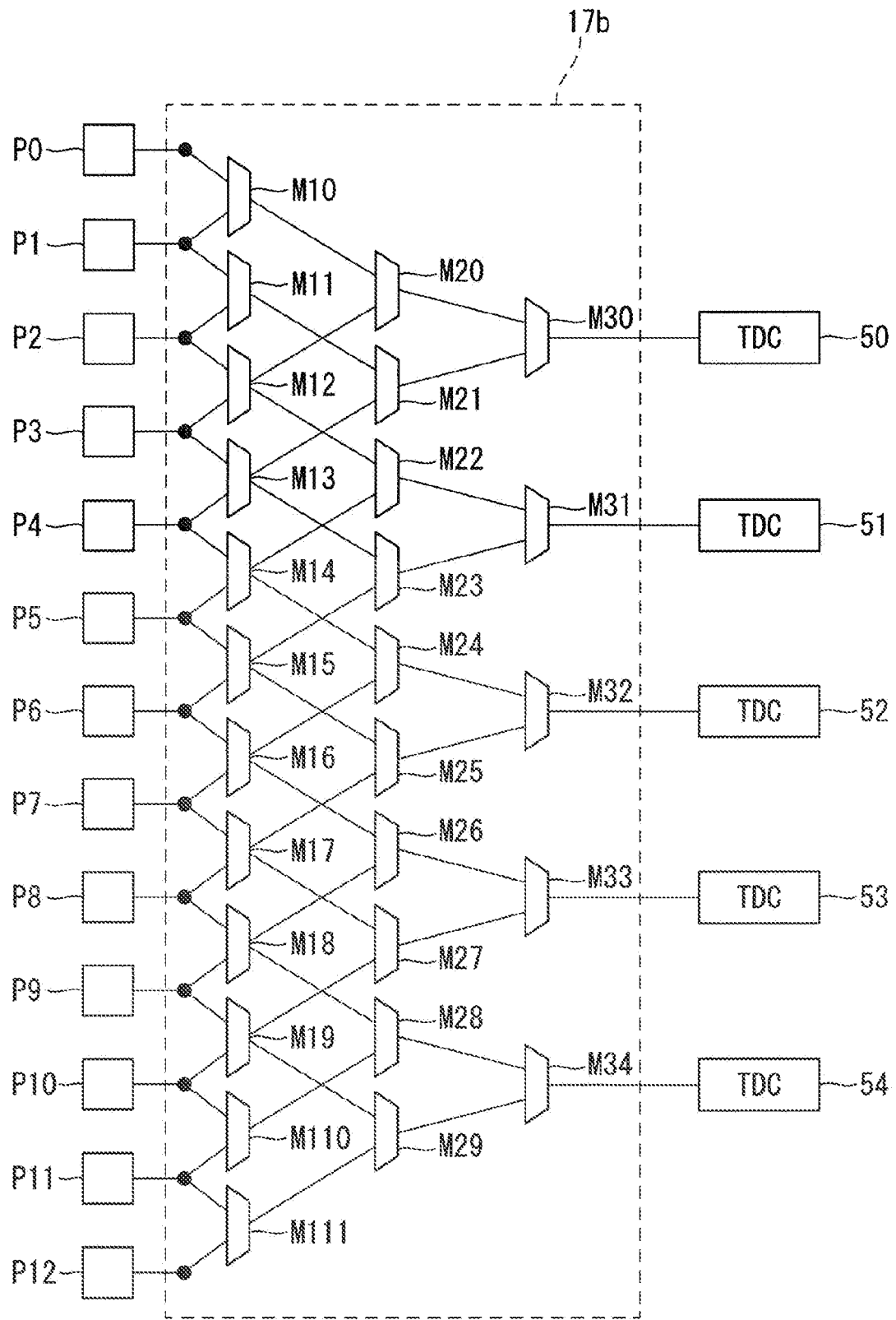
FIG. 10B is a schematic view of one example of a selection section according to a second modification of the first embodiment of the present technology.

As illustrated in FIG. 10B, a selection section 17b according to a second modification of the first embodiment of the present technology has a configuration in which the first-stage multiplexers M12, M13, M14, M15, M16, M17, M18, and M19 are adaptable to sharing usage, as in the selection section 17 according to the first embodiment illustrated in FIG. 8A. However, unlike the selection section 17 according to the first embodiment illustrated in FIG. 8A, the selection section 17b according to the second modification has a configuration in which the second-stage multiplexers M24 and M25 are not adaptable to sharing usage.

As illustrated in FIG. 10B, the input side of the third-stage multiplexer M30 in the selection section 17b according to the second modification is connected to the second-stage multiplexers M20 and 21. The input side of the third-stage multiplexer M31 is connected to the second-stage multiplexers M22 and 23. The input side of the third-stage multiplexer M32 is connected to the second-stage multiplexers M24 and 25. The input side of the third-stage multiplexer M33 is connected to the second-stage multiplexers M26 and 27. The input side of the third-stage multiplexer M34 is connected to the second-stage multiplexers M28 and 29. The output sides of the third-stage multiplexers M30 to M34 are respectively connected to five time measuring circuits (TDC) 50 to 54. The selection section 17b according to the second modification can be formed of a total of 27 multiplexers. According to the first modification of the first embodiment of the present technology, the multiplexers of at least the first stage in the selection section 17b are adaptable to sharing usage. Accordingly, the circuit scale of the selection section 17b can be reduced.

Second Embodiment

Figure 11:
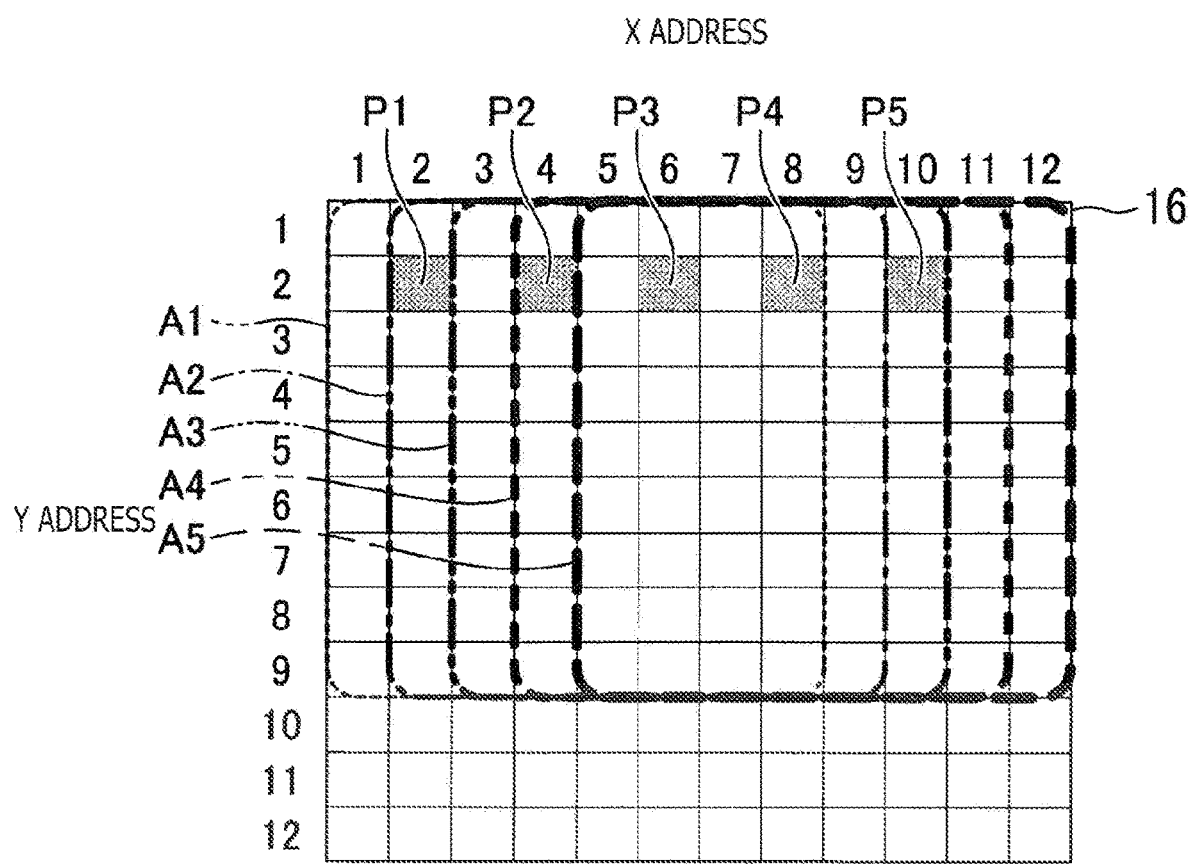
FIG. 11 is a schematic view of one example of an active pixel defining process according to a second embodiment of the present technology.

A ranging system according to the second embodiment of the present technology has a configuration similar to that of the ranging system according to the first embodiment illustrated in FIG. 1. In the second embodiment, among 12×12 pixels constituting the pixel array 16 of the light receiving section 2 illustrated in FIG. 3, pixels P1 to P5 are defined in five pixel defining ranges A1 to A5, as illustrated in FIG. 11. The pixel defining ranges A1 to A5 are each defined by 8×8 pixels, and are shifted from each other in the horizontal direction by one pixel.

Selection Section According to Comparative Example of Second Embodiment

Prior to an explanation of a selection section according to the second embodiment, a selection section 17y according to a comparative example of the second embodiment will be explained with reference to FIG. 12. The selection section 17y according to the comparative example includes vertical-direction selection circuits M00, M01, M02, M03, M04, M05, M06, M07, M08, M09, M10, and M011, and horizontal-direction selection circuits M0, M1, M2, M3, and M4. The input side of the selection circuit M00 is connected to eight pixels at addresses (X, Y)=(1, 1), (1, 2), (1, 3), (1, 4), . . . , and (1, 8), and the output side of the selection circuit M00 is connected to the selection circuit M0. The selection circuit M00 selects any one of signals outputted from the eight pixels at addresses (X, Y)=(1, 1), (1, 2), (1, 3), (1, 4), . . . , and (1, 8), and outputs the selected signal to the selection circuit M0.

The input side of the selection circuit M01 is connected to eight pixels at addresses (2, 1), (2, 2), (2, 3), (2, 4), . . . , and (2, 8), and the output side of the selection circuit M01 is connected to the selection circuits M0 and M1. The selection circuit M01 selects any one of signals outputted from the eight pixels at addresses (2, 1), (2, 2), (2, 3), (2, 4), . . . , and (2, 8), and outputs the selected signal to the selection circuits M0 and M1. The circuit configurations of the selection circuits M02 to M011 are similar to those of the selection circuits M00 and M01, and thus, a redundant explanation thereof is omitted.

The output sides of the horizontal-direction selection circuits M0 to M4 are connected to five time measuring circuits (TDC) 50 to 54. The selection circuits M0 to M4 select signals outputted from the active pixels P1 to P5 defined in the pixel defining ranges A1 to A5 illustrated in FIG. 11 and output the selected signals to the time measuring circuits 50 to 54, respectively.

The selection circuit M0 selects either the one signal selected and outputted by the selection circuit M00 or the one signal selected and outputted by the selection circuit M01 and outputs the selected signal to the time measuring circuit 50. The selection circuit M0 includes the first-stage multiplexers M10, M11, M12, and M13, the second-stage multiplexers M20 and M21, and the third-stage multiplexer M30.

The input side of the first-stage multiplexer M10 is connected to the selection circuits M00 and M01, and the output side of the first-stage multiplexer M10 is connected to the input side of the second-stage multiplexer M20. The first-stage multiplexer M10 performs a multiplexing process of selecting either the one signal selected and outputted by the selection circuit M00 or the one signal selected and outputted by the selection circuit M01 and outputting the selected signal to the second-stage multiplexer M20.

Also, the input side of the first-stage multiplexer M11 is connected to the selection circuits M02 and M03, and the output side of the first-stage multiplexer M11 is connected to the input side of the second-stage multiplexer M20. The first-stage multiplexer M11 performs a multiplexing process of selecting either the one signal selected and outputted by the selection circuit M02 or the one signal selected and outputted by the selection circuit M03 and outputting the selected signal to the second-stage multiplexer M20.

Also, the input side of the first-stage multiplexer M12 is connected to the selection circuits M04 and M05, and the output side of the first-stage multiplexer M12 is connected to the input side of the second-stage multiplexer M21. The first-stage multiplexer M12 performs a multiplexing process of selecting either the one signal selected and outputted by the selection circuit M04 or the one signal selected and outputted by the selection circuit M05 and outputting the selected signal to the second-stage multiplexer M21.

Also, the input side of the first-stage multiplexer M13 is connected to the selection circuits M06 and M07, and the output side of the first-stage multiplexer M13 is connected to the input side of the second-stage multiplexer M21. The first-stage multiplexer M13 performs a multiplexing process of selecting either the one signal selected and outputted by the selection circuit M06 or the one signal selected and outputted by the selection circuit M07 and outputting the selected signal to the second-stage multiplexer M21.

Also, the input side of the second-stage multiplexer M20 is connected to the output sides of the first-stage multiplexers M10 and M11, and the output side of the second-stage multiplexer M20 is connected to the input side of the third-stage multiplexer M30. The second-stage multiplexer M20 performs a multiplexing process of selecting either the one signal selected and outputted by the first-stage multiplexer M10 or the one signal selected and outputted by the first-stage multiplexer M11 and outputting the selected signal to the third-stage multiplexer M30.

Also, the input side of the second-stage multiplexer M21 is connected to the output sides of the first-stage multiplexers M12 and M13, and the output side of the second-stage multiplexer M21 is connected to the input side of the third-stage multiplexer M30. The second-stage multiplexer M21 performs a multiplexing process of selecting either the one signal selected and outputted by the first-stage multiplexer M12 or the one signal selected and outputted by the first-stage multiplexer M13 and outputting the selected signal to the third-stage multiplexer M30.

Also, the input side of the third-stage multiplexer M30 is connected to the output sides of the second-stage multiplexers M20 and M21, and the output side of the third-stage multiplexer M30 is connected to the time measuring circuit 50. The third-stage multiplexer M30 performs a multiplexing process of selecting either the one signal selected and outputted by the second-stage multiplexer M20 or the one signal selected and outputted by the second-stage multiplexer M21, and outputs the selected signal to the time measuring circuit 50.

The selection circuit M1 selects any one of signals respectively selected and outputted by the selection circuits M01 to M08 and outputs the selected signal to the time measuring circuit 51. The selection circuit M1 includes the first-stage multiplexers M14, M15, M16, and M17, the second-stage multiplexers M22 and M23, and the third-stage multiplexer M31. The circuit configuration of the selection circuit M1 is similar to that of the selection circuit M0, and thus, a redundant explanation thereof is omitted.

The selection circuit M2 selects any one of signals respectively selected and outputted by the selection circuits M02 to M09 and outputs the selected signal to the time measuring circuit 52. The selection circuit M2 includes the first-stage multiplexers M18, M19, M110, and M111, the second-stage multiplexers M24 and M25, and the third-stage multiplexer M32. The circuit configuration of the selection circuit M2 is similar to that of the selection circuit M0, and thus, a redundant explanation thereof is omitted.

The selection circuit M3 selects any one of signals respectively selected and outputted by the selection circuits M03 to M010 and outputs the selected signal to the time measuring circuit 53. The selection circuit M3 includes the first-stage multiplexers M112, M113, M114, and M115, the second-stage multiplexers M26 and M27, and the third-stage multiplexer M33. The circuit configuration of the selection circuit M3 is similar to that of the selection circuit M0, and thus, a redundant explanation thereof is omitted.

The selection circuit M4 selects any one of signals respectively selected and outputted by the selection circuits M04 to M011 and outputs the selected signal to the time measuring circuit 54. The selection circuit M4 includes the first-stage multiplexers M116, M117, M118, and M119, the second-stage multiplexers M28 and M29, and the third-stage multiplexer M34. The circuit configuration of the selection circuit M4 is similar to that of the selection circuit M0, and thus, a redundant explanation thereof is omitted.

Figure 12:
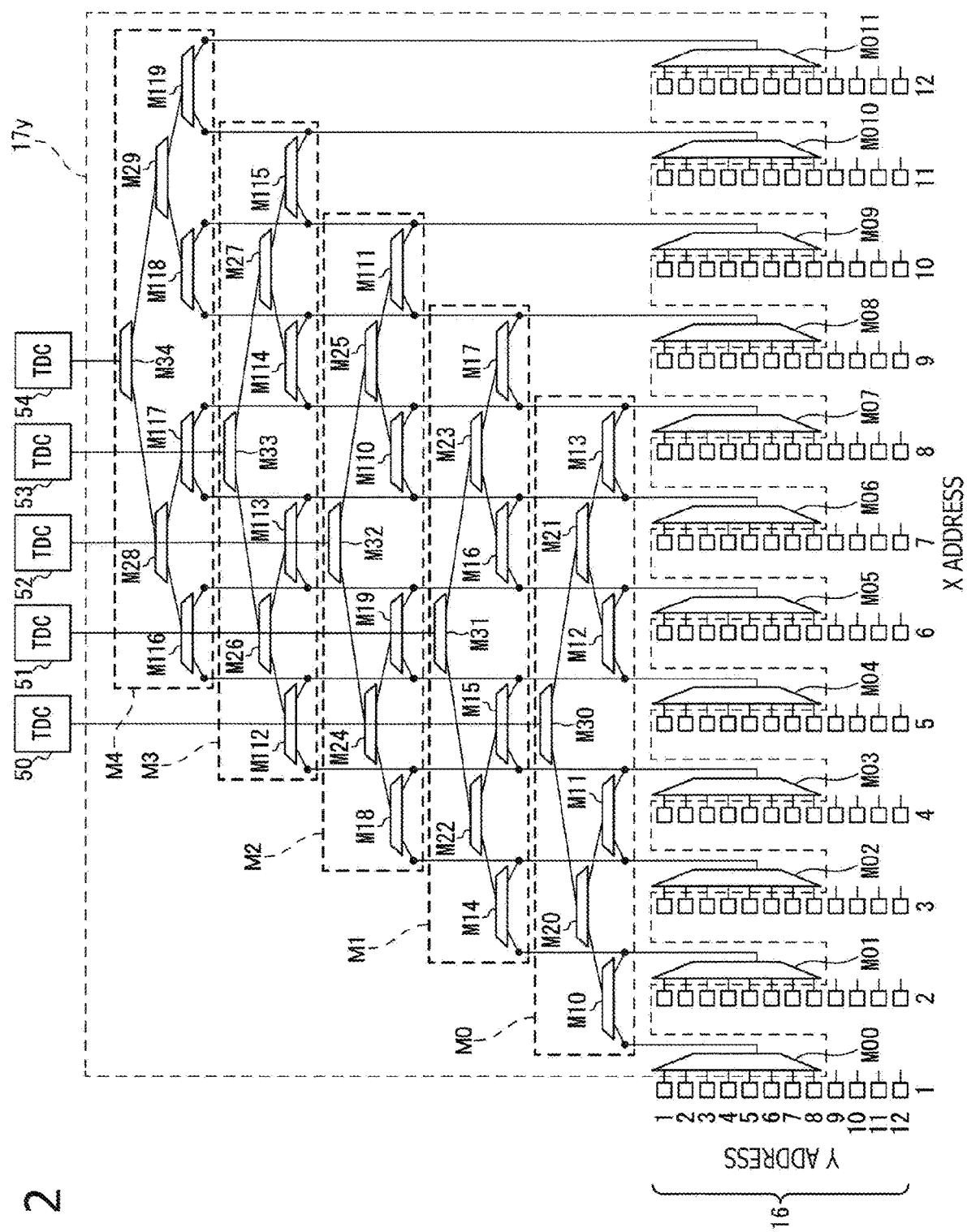
FIG. 12 is a schematic view of a selection section according to a comparative example of the second embodiment of the present technology.

With the selection section 17$y$ according to the comparative example of the second embodiment illustrated in FIG. 12, signals outputted from the pixels defined as active pixels in the pixel defining ranges A1 to A5 in the pixel array 16 illustrated in FIG. 11 can be selected and be outputted to the time measuring circuits 50 to 54. However, in the selection section 17$y$ according to the comparative example of the second embodiment, the selection circuits M0 to M4 of are each formed of seven multiplexers. Accordingly, a total of 35 multiplexers are necessary. Consequently, the circuit scale is increased, and signal paths are extended, so that timing skew between pixels is likely to be increased.

Selection Section According to Second Embodiment

In contrast, a selection section 17$c$ according to the second embodiment of the present technology will be explained with reference to FIG. 13A. As with the selection section 17$y$ according to the comparative example illustrated in FIG. 12, the selection section 17$c$ according to the second embodiment selects signals respectively outputted from the active pixels P1 to P5 defined in the pixel defining ranges A1 to A5 illustrated in FIG. 11 and outputs the signals to the time measuring circuits 50 to 54. The configurations of the vertical-direction selection circuits M00 to M011 in the selection section 17$c$ according to the second embodiment are identical to those of the selection circuits M00 to M011 in the selection section 17$y$ according to the comparative example illustrated in FIG. 12. However, the configuration of a horizontal-direction selection circuit M012 in the selection section 17$c$ according to the second embodiment is different from those of the selection circuits M0 to M4 in the selection section 17$y$ according to the comparative example illustrated in FIG. 12.

The horizontal-direction selection circuit M012 includes the first-stage multiplexers M10, M11, M12, M13, M14, M15, M16, M17, M18, M19, and M110, the second-stage multiplexers M20, M21, M22, M23, M24, M25, M26, M27, and M28, and the third-stage multiplexers M30, M31, M32, M33, and M34. The first-stage multiplexers M10 to M110, the second-stage multiplexers M20 to M28, and the third-stage multiplexers M30 to M34 are each connected to the control section 3 illustrated in FIG. 1 and are each operated according to a control signal from the control section 3.

The input side of the first-stage multiplexer M10 is connected to the selection circuits M00 and M01, and the output side of the first-stage multiplexer M10 is connected to the second-stage multiplexer M20. The first-stage multiplexer M10 performs a multiplexing process of selecting either the one signal selected and outputted by the selection circuit M00 or the one signal selected and outputted by the selection circuit M01 and outputting the selected signal to the second-stage multiplexer M20.

Also, the input side of the first-stage multiplexer M11 is connected to the selection circuits M01 and M02, and the output side of the first-stage multiplexer M11 is connected to the second-stage multiplexer M21. The first-stage multiplexer M11 performs a multiplexing process of selecting either the one signal selected and outputted by the selection circuit M01 or the one signal selected and outputted by the selection circuit M02 and outputting the selected signal to the second-stage multiplexer M21.

Also, the input side of the first-stage multiplexer M12 is connected to the selection circuits M02 and M03, and the output side of the first-stage multiplexer M12 is connected to both the second-stage multiplexers M20 and M22. The first-stage multiplexer M12 performs a multiplexing process of selecting either the one signal selected and outputted by the selection circuit M02 or the one signal selected and outputted by the selection circuit M03 and outputting the selected signal to the second-stage multiplexers M20 and M22.

Also, the input side of the first-stage multiplexer M13 is connected to the selection circuits M03 and M04, and the output side of the first-stage multiplexer M13 is connected to both the second-stage multiplexers M21 and M22. The first-stage multiplexer M13 performs a multiplexing process of selecting either the one signal selected and outputted by the selection circuit M03 or the one signal selected and outputted by the selection circuit M04 and outputting the selected signal to the second-stage multiplexers M21 and M23.

Also, the input side of the first-stage multiplexer M14 is connected to the selection circuits M04 and M05, and the output side of the first-stage multiplexer M14 is connected to both the second-stage multiplexers M22 and M24. The first-stage multiplexer M14 performs a multiplexing process of selecting either the one signal selected and outputted by the selection circuit M04 or the one signal selected and outputted by the selection circuit M05 and outputting the selected signal to the second-stage multiplexers M22 and M24. The circuit configurations of the first-stage multiplexers M15 to M110 are similar to those of the first-stage multiplexers M10 to M14, and thus, a redundant explanation thereof is omitted.

The input side of the second-stage multiplexer M20 is connected to the first-stage multiplexers M10 and M12, and the output side of the second-stage multiplexer M20 is connected to the third-stage multiplexer M30. The second-stage multiplexer M20 performs a multiplexing process of selecting either the one signal selected and outputted by the first-stage multiplexer M10 or the one signal selected and outputted by the first-stage multiplexer M12 and outputting the selected signal to the third-stage multiplexer M30.

Also, the input side of the second-stage multiplexer M21 is connected to the first-stage multiplexers M11 and M13, and the output side of the second-stage multiplexer M21 is connected to the third-stage multiplexer M31. The second-stage multiplexer M21 performs a multiplexing process of selecting either the one signal selected and outputted by the first-stage multiplexer M11 or the one signal selected and outputted by the first-stage multiplexer M13 and outputting the selected signal to the third-stage multiplexer M31.

Also, the input side of the second-stage multiplexer M22 is connected to the first-stage multiplexers M12 and M14, and the output side of the second-stage multiplexer M22 is connected to the third-stage multiplexer M32. The second-stage multiplexer M22 performs a multiplexing process of selecting either the one signal selected and outputted by the first-stage multiplexer M12 or the one signal selected and outputted by the first-stage multiplexer M14 and outputting the selected signal to the third-stage multiplexer M32.

Also, the input side of the second-stage multiplexer M23 is connected to the first-stage multiplexers M13 and M15, and the output side of the second-stage multiplexer M23 is connected to the third-stage multiplexer M33. The second-stage multiplexer M23 performs a multiplexing process of selecting either the one signal selected and outputted by the first-stage multiplexer M13 or the one signal selected and outputted by the first-stage multiplexer M15 and outputting the selected signal to the third-stage multiplexer M33.

Also, the input side of the second-stage multiplexer M24 is connected to the first-stage multiplexers M14 and M16, and the output side of the second-stage multiplexer M22 is connected to both the third-stage multiplexers M30 and M34. The second-stage multiplexer M24 performs a multiplexing process of selecting either the one signal selected and outputted by the first-stage multiplexer M14 or the one signal selected and outputted by the first-stage multiplexer M16 and outputting the selected signal to the third-stage multiplexers M30 and M34. The circuit configurations of the second-stage multiplexers M25 to M28 are similar to those of the second-stage multiplexers M20 to M24, and thus, a redundant explanation thereof is omitted.

The input side of the third-stage multiplexer M30 is connected to the second-stage multiplexers M20 and M24, and the output side of the third-stage multiplexer M30 is connected to the time measuring circuit 50. The third-stage multiplexer M30 performs a multiplexing process of selecting either the one signal selected and outputted by the second-stage multiplexer M20 or the one signal selected and outputted by the second-stage multiplexer M24 and outputting the selected signal to the time measuring circuit 50.

Also, the input side of the third-stage multiplexer M31 is connected to the second-stage multiplexers M21 and M25, and the output side of the third-stage multiplexer M31 is connected to the time measuring circuit 51. The third-stage multiplexer M31 performs a multiplexing process of selecting either the one signal selected and outputted by the second-stage multiplexer M21 or the one signal selected and outputted by the second-stage multiplexer M25 and outputting the selected signal to the time measuring circuit 51.

Also, the input side of the third-stage multiplexer M32 is connected to the second-stage multiplexers M22 and M26, and the output side of the third-stage multiplexer M32 is connected to the time measuring circuit 52. The third-stage multiplexer M32 performs a multiplexing process of selecting either the one signal selected and outputted by the second-stage multiplexer M22 or the one signal selected and outputted by the second-stage multiplexer M26 and outputting the selected signal to the time measuring circuit 52. The circuit configurations of the third-stage multiplexers M33 and M34 are similar to those of the third-stage multiplexers M30 to M32, and thus, a redundant explanation thereof is omitted.

In the selection section 17c according to the second embodiment of the present technology, the multiplexers, for which pixel defining ranges overlap each other in the selection section 17y according to the comparative example illustrated in FIG. 12, are adaptable to sharing usage. That is, by modifying the two first-stage multiplexers M11 and M18 in the selection section 17y according to the comparative example illustrated in FIG. 12 so as to be adaptable to sharing usage, the single first-stage multiplexer M12 in the selection section 17c according to the second embodiment illustrated in FIG. 13A is obtained. Also, by modifying the two first-stage multiplexers M15 and M112 in the selection section 17y according to the comparative example illustrated in FIG. 12 so as to be adaptable to sharing usage, the single first-stage multiplexer M13 in the selection section 17c according to the second embodiment illustrated in FIG. 13A is obtained.

Figure 13A:
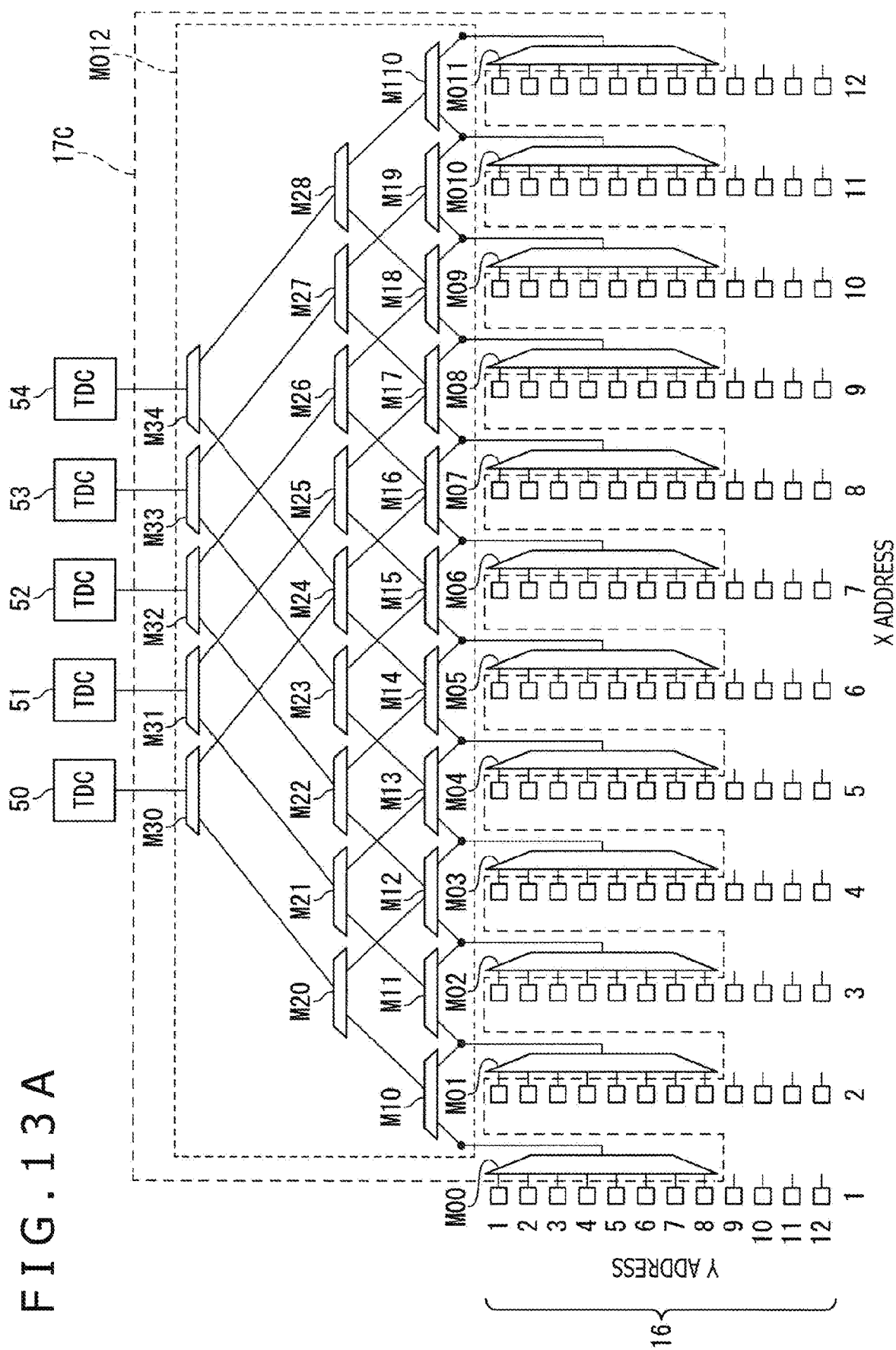
FIG. 13A is a schematic view of one example of a selection section according to the second embodiment of the present technology.

Also, by modifying the three first-stage multiplexers M12, M19, and M116 in the selection section 17y according to the comparative example illustrated in FIG. 12 so as to be adaptable to sharing usage, the single first-stage multiplexer M14 in the selection section 17c according to the second embodiment illustrated in FIG. 13A is obtained. Also, by modifying the two first-stage multiplexers M16 and M113 in the selection section 17y according to the comparative example illustrated in FIG. 12 so as to be adaptable to sharing usage, the single first-stage multiplexer M15 in the selection section 17c according to the second embodiment illustrated in FIG. 13A is obtained.

Also, by modifying the three first-stage multiplexers M13, M110, and M117 in the selection section 17y according to the comparative example illustrated in FIG. 12 so as to be adaptable to sharing usage, the single first-stage multiplexer M16 in the selection section 17c according to the second embodiment illustrated in FIG. 13A is obtained. Also, by modifying the two first-stage multiplexers M17 and M114 in the selection section 17y according to the comparative example illustrated in FIG. 12 so as to be adaptable to sharing usage, the single first-stage multiplexer M17 in the selection section 17c according to the second embodiment illustrated in FIG. 13A is obtained. Also, by modifying the two first-stage multiplexers M111 and M118 in the selection section 17y according to the comparative example illustrated in FIG. 12 so as to be adaptable to sharing usage, the single first-stage multiplexer M18 in the selection section 17c according to the second embodiment illustrated in FIG. 13A is obtained.

Also, by modifying the two second-stage multiplexers M21 and M28 in the selection section 17y according to the comparative example illustrated in FIG. 12 so as to be adaptable to sharing usage, the single second-stage multiplexer M24 in the selection section 17c according to the second embodiment illustrated in FIG. 13A is obtained. Accordingly, the selection section 17c according to the second embodiment of the present technology can be formed of a total of 28 multiplexers. Therefore, the circuit scale can be reduced, and timing skew can be improved, compared to the selection section 17y according to the comparative example illustrated in FIG. 12.

In addition, since the multiplexers are set to be adaptable to sharing usage, the selection section 17c according to the second embodiment illustrated in FIG. 13A is subjected to a constraint that two inputs cannot be simultaneously used at a multiplexer modified for sharing usage. However, if the time measuring circuits 50 to 54 are properly connected, any arrangement of active pixels can be realized. Accordingly, the same degree of freedom can be obtained in terms of the functions.

Figure 13B:
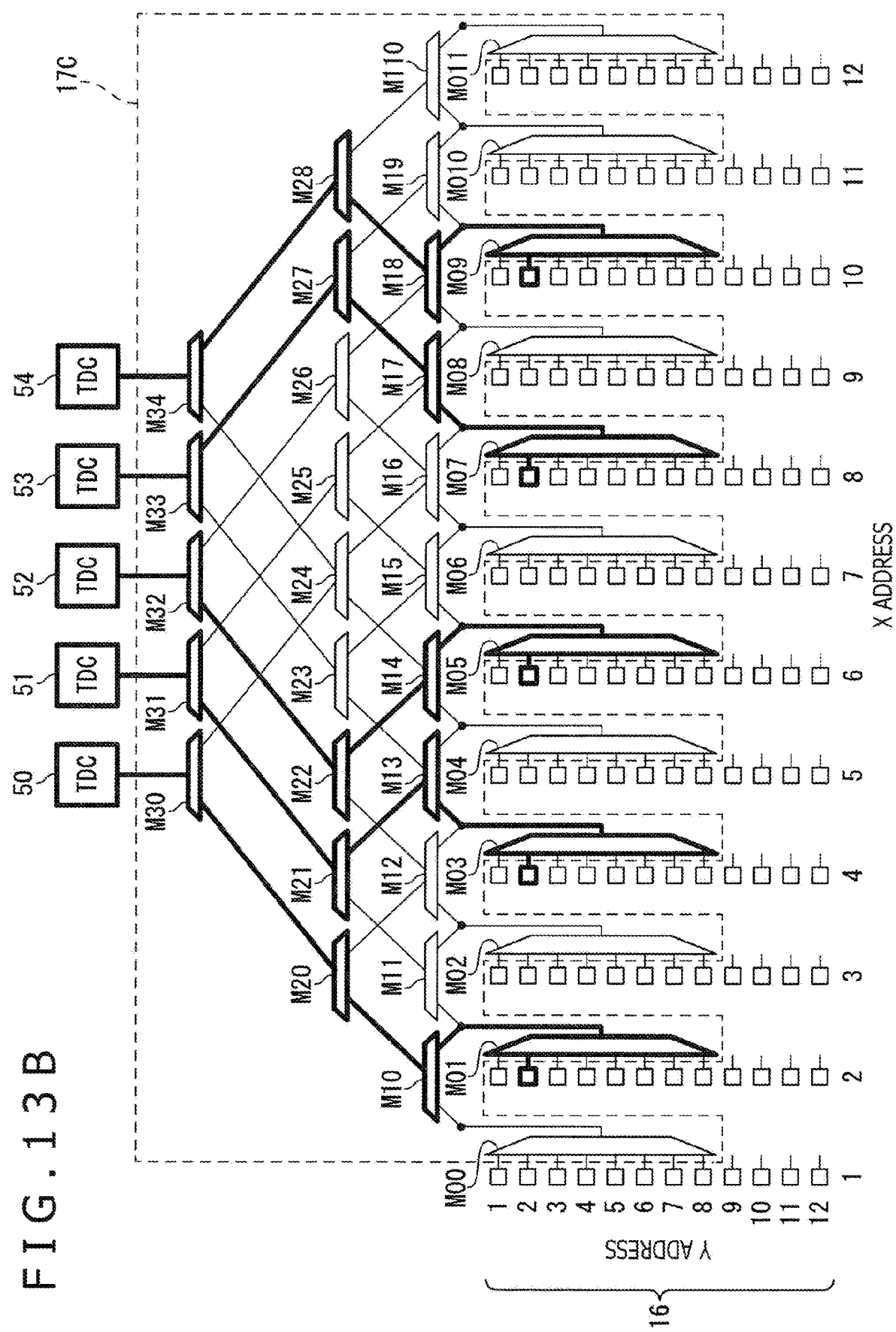
FIG. 13B is a schematic view of one operation example of the selection section illustrated in FIG. 13A.

For example, it is assumed that active pixels P1 to P5 are defined at addresses (X, Y)=(2, 2), (4, 2), (6, 2), (8, 2), and (10, 2), as illustrated in FIG. 11. In this case, paths from the five pixels at addresses (2, 2), (4, 2), (6, 2), (8, 2), and (10, 2) to the time measuring circuits 50 to 54 are selected, as highlighted with thick lines in FIG. 13B.

Specifically, a signal outputted from the pixel at the address (2, 2) is selected by the vertical-direction selection circuit M01, is further selected by the first-stage multiplexer M10, the second-stage multiplexer M20, and the third-stage multiplexer M30 in the horizontal-direction selection circuit M012, and is outputted to the time measuring circuit 50. A signal outputted from the pixel at the address (4, 2) is selected by the vertical-direction selection circuit M03, is further selected by the first-stage multiplexer M13, the second-stage multiplexer M21, and the third-stage multiplexer M31 in the horizontal-direction selection circuit M012, and is outputted to the time measuring circuit 51.

A signal outputted from the pixel at the address (6, 2) is selected by the vertical-direction selection circuit M05, is further selected by the first-stage multiplexer M14, the second-stage multiplexer M22, and the third-stage multiplexer M32 in the horizontal-direction selection circuit M012, and is outputted to the time measuring circuit 52. A signal outputted from the pixel at the address (8, 2) is selected by the vertical-direction selection circuit M07, is further selected by the first-stage multiplexer M17, the second-stage multiplexer M27, and the third-stage multiplexer M33 in the horizontal-direction selection circuit M012, and is outputted to the time measuring circuit 53. A signal outputted from the pixel at the address (10, 2) is selected by the vertical-direction selection circuit M09, is further selected by the first-stage multiplexer M18, the second-stage multiplexer M28, and the third-stage multiplexer M34 in the horizontal-direction selection circuit M012, and is outputted to the time measuring circuit 54.

Effects of Second Embodiment

In the ranging system according to the second embodiment, the control section 3 defines the multiple pixels in the pixel array 16 of the light receiving section 2 as active pixels and non-active pixels, as explained so far. Further, signals outputted from the pixels defined as the active pixels are outputted from the light receiving section 2 to the ranging processing section 4. Accordingly, when active pixels are properly defined, an optical displacement such as an aberration or a magnification in a light spot during manufacturing and assembling, etc. can be corrected.

Moreover, since the selection section 17c according to the second embodiment illustrated in FIG. 13A is provided in the ranging system according to the second embodiment, switching between an active pixel and a non-active pixel can be properly performed. In addition, compared to the selection section 17y according to the comparative example illustrated in FIG. 12, the circuit scale can be reduced, and timing skew can be improved, because the multiplexers are adaptable to sharing usage.

It is to be noted that the selection section 17c according to the second embodiment illustrated in FIG. 13A is an example, and the selection section is not limited thereto. For example, although the selection circuit M012 in the selection section 17c according to the second embodiment illustrated in FIG. 13A has a three-stage configuration, the selection circuit may have a two-stage configuration as in the selection section 17a illustrated in FIG. 10A, and only the multiplexers at the first stage may be adaptable to sharing usage as in the selection section 17b illustrated in FIG. 10B.

Third Embodiment

Figure 14:
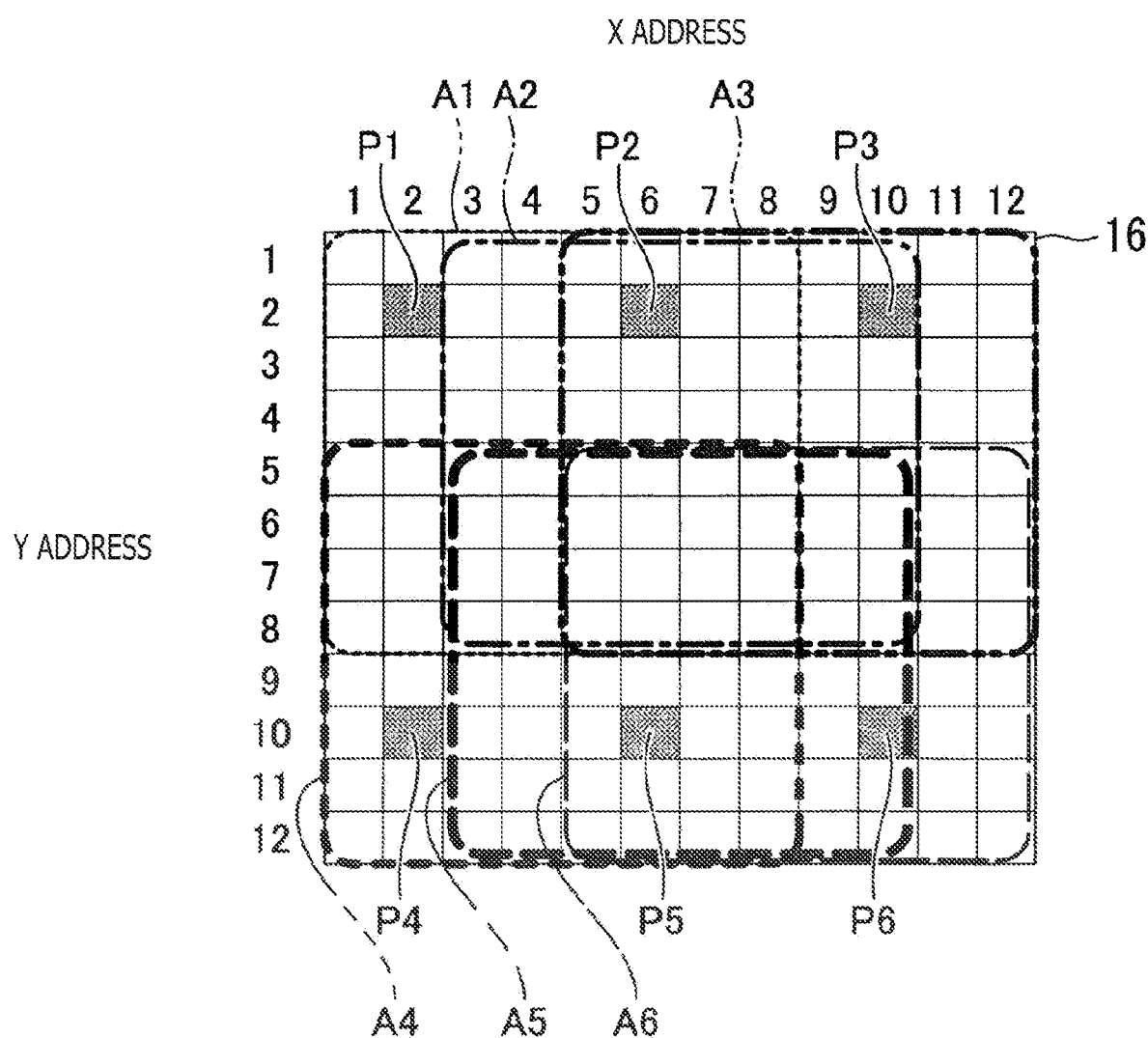
FIG. 14 is a schematic view of one example of an active pixel defining process according to a third embodiment of the present technology.

A ranging system according to the third embodiment of the present technology has a configuration similar to that of the ranging system according to the first embodiment illustrated in FIG. 1. The third embodiment is exemplified by a case where pixels P1 to P6 of six pixel defining ranges A1 to A6 are defined in the pixel array 16 which is formed of 12×12 pixels in the light receiving section 2, as illustrated in FIG. 14. The pixel defining ranges A1 to A6 are defined so as to partially overlap each other. The pixel defining ranges A1 to A3 are each defined into an 8×8 pixel region and are shifted from each other in the horizontal direction by two pixels. The pixel defining ranges A4 to A6 are each defined into an 8×8 pixel region, are respectively shifted in the vertical direction from the pixel defining ranges A1 to A3 by four pixels, and are shifted from each other in the horizontal direction by two pixels.

Selection Section According to Comparative Example of Third Embodiment

Here, prior to an explanation of a selection section according to the third embodiment, a selection section 17z according to a comparative example of the third embodiment will be explained with reference to FIG. 15. The selection section 17z according to the comparative example includes vertical-direction and horizontal-direction selection circuits M00, M01, M02, M03, M04, M05, M06, M07, M08, M09, M10, M011, M012, M013, M014, M015, M016, and M017, and vertical-direction and horizontal-direction selection circuits M0, M1, M2, M3, M4, and M5.

The input side of the selection circuit M00 is connected to eight pixels at addresses (X, Y)=(1, 1), (1, 2), (1, 3), (1, 4), (2, 1), (2, 2), (2, 3), and (2, 4), and the output side of the selection circuit M00 is connected to the selection circuit M0. The selection circuit M00 selects any one of signals outputted from the eight pixels at addresses (1, 1), (1, 2), (1, 3), (1, 4), (2, 1), (2, 2), (2, 3), and (2, 4), and outputs the selected signal to the selection circuit M0.

The input side of the selection circuit M01 is connected to eight pixels at addresses (1, 5), (1, 6), (1, 7), (1, 8), (2, 5), (2, 6), (2, 7), and (2, 8), and the output side of the selection circuit M01 is connected to the selection circuits M0 and M3. The selection circuit M01 selects any one of signals outputted from the eight pixels at addresses (1, 5), (1, 6), (1, 7), (1, 8), (2, 5), (2, 6), (2, 7), and (2, 8), and outputs the selected signal to the selection circuits M0 and M3. The circuit configurations of the selection circuits M02 to M017 are similar to those of the selection circuits M00 and M01, and thus, a redundant explanation thereof is omitted.

The output sides of six selection circuits M0 to M5 are connected to six time measuring circuits (TDC) 50 to 55, respectively. The selection circuit M0 selects any one of signals respectively selected and outputted by the selection circuits M00, M01, M03, M04, M06, M07, M09, and M010, and outputs the selected signal to the time measuring circuit 50. The selection circuit M0 includes the first-stage multiplexers M10, M11, M12, and M13, the second-stage multiplexers M20 and M21, and the third-stage multiplexer M30.

The input side of the first-stage multiplexer M10 is connected to the selection circuits M00 and M01, and the output side of the first-stage multiplexer M10 is connected to the input side of the second-stage multiplexer M20. The first-stage multiplexer M10 performs a multiplexing process of selecting either the one signal selected and outputted by the selection circuit M00 or the one signal selected and outputted by the selection circuit M01 and outputting the selected signal to the second-stage multiplexer M20.

Also, the input side of the first-stage multiplexer M11 is connected to the selection circuits M03 and M04, and the output side of the first-stage multiplexer M11 is connected to the input side of the second-stage multiplexer M20. The first-stage multiplexer M11 performs a multiplexing process of selecting either the one signal selected and outputted by the selection circuit M03 or the one signal selected and outputted by the selection circuit M04 and outputting the selected signal to the second-stage multiplexer M20.

Also, the input side of the first-stage multiplexer M12 is connected to the selection circuits M06 and M07, and the output side of the first-stage multiplexer M12 is connected to the input side of the second-stage multiplexer M21. The first-stage multiplexer M12 performs a multiplexing process of selecting either the one signal selected and outputted by the selection circuit M06 or the one signal selected and outputted by the selection circuit M07 and outputting the selected signal to the second-stage multiplexer M21.

Also, the input side of the first-stage multiplexer M13 is connected to the selection circuits M09 and M010, and the output side of the first-stage multiplexer M13 is connected to the input side of the second-stage multiplexer M21. The first-stage multiplexer M13 performs a multiplexing process of selecting either the one signal selected and outputted by the selection circuit M09 or the one signal selected and outputted by the selection circuit M010 and outputting the selected signal to the second-stage multiplexer M21.

Also, the input side of the second-stage multiplexer M20 is connected to the output sides of the first-stage multiplexers M10 and M11, and the output side of the second-stage multiplexer M20 is connected to the input side of the third-stage multiplexer M30. The second-stage multiplexer M20 performs a multiplexing process of selecting either the one signal selected and outputted by the first-stage multiplexer M10 or the one signal selected and outputted by the first-stage multiplexer M11 and outputting the selected signal to the third-stage multiplexer M30.

Also, the input side of the second-stage multiplexer M21 is connected to the output sides of the first-stage multiplexers M12 and M13, and the output side of the second-stage multiplexer M21 is connected to the input side of the third-stage multiplexer M30. The second-stage multiplexer M21 performs a multiplexing process of selecting either the one signal selected and outputted by the first-stage multiplexer M12 or the one signal selected and outputted by the first-stage multiplexer M13 and outputting the selected signal to the third-stage multiplexer M30.

Also, the input side of the third-stage multiplexer M30 is connected to the output sides of the second-stage multiplexers M20 and M21, and the output side of the third-stage multiplexer M30 is connected to the time measuring circuit (TDC) 50. The third-stage multiplexer M30 performs a multiplexing process of selecting either the one signal selected and outputted by the second-stage multiplexer M20 or the one signal selected and outputted by the second-stage multiplexer M21 and outputting the selected signal to the time measuring circuit 50.

The selection circuit M1 selects any one of the signals respectively selected and outputted by the selection circuits M03, M04, M06, M07, M09, M010, M012, and M013, and outputs the selected signal to the time measuring circuit 52. The selection circuit M1 includes the first-stage multiplexers M14, M15, M16, and M17, the second-stage multiplexers M22 and M23, and the third-stage multiplexer M31. The circuit configuration of the selection circuit M1 is similar to that of the selection circuit M0, and thus, a redundant explanation thereof is omitted.

The selection circuit M2 selects any one of the signals respectively selected and outputted by the selection circuits M06, M07, M09, M010, M012, M013, M015, and M016, and outputs the selected signal to the time measuring circuit 54. The selection circuit M2 includes the first-stage multiplexers M18, M19, M110, and M111, the second-stage multiplexers M24 and M25, and the third-stage multiplexer M32. The circuit configuration of the selection circuit M2 is similar to that of the selection circuit M0, and thus, a redundant explanation thereof is omitted.

The selection circuit M3 selects any one of the signals respectively selected and outputted by the selection circuits M01, M02, M04, M05, M07, M08, M010, and M011, and outputs the selected signal to the time measuring circuit 51. The selection circuit M3 includes the first-stage multiplexers M112, M113, M114, and M115, the second-stage multiplexers M26 and M27, and the third-stage multiplexer M33. The circuit configuration of the selection circuit M3 is similar to that of the selection circuit M0, and thus, a redundant explanation thereof is omitted.

The selection circuit M4 selects any one of the signals respectively selected and outputted by the selection circuits M04, M05, M07, M08, M010, M011, M013, and M014, and outputs the selected signal to the time measuring circuit 53. The selection circuit M4 includes the first-stage multiplexers M116, M117, M118, and M119, the second-stage multiplexers M28 and M29, and the third-stage multiplexer M34. The circuit configuration of the selection circuit M4 is similar to that of the selection circuit M0, and thus, a redundant explanation thereof is omitted.

The selection circuit M5 selects any one of the signals respectively selected and outputted by the selection circuits M07, M08, M010, M011, M013, M014, M016, and M017, and outputs the selected signal to the time measuring circuit 55. The selection circuit M5 includes the first-stage multiplexers M120, M121, M122, and M123, the second-stage multiplexers M210 and M211, and the third-stage multiplexer M35. The circuit configuration of the selection circuit M5 is similar to that of the selection circuit M0, and thus, a redundant explanation thereof is omitted.

Figure 15:
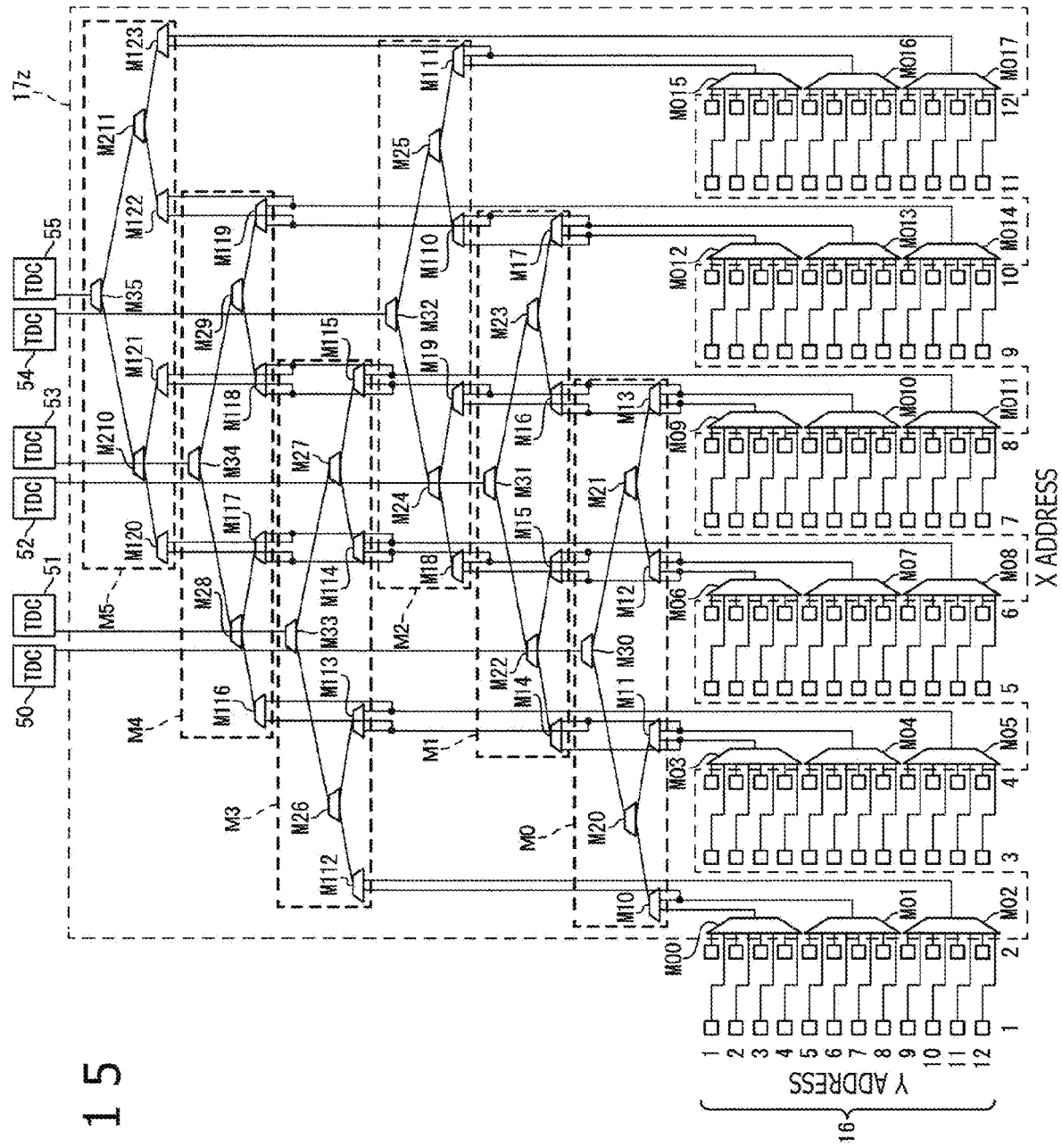
FIG. 15 is a schematic view of a selection section according to a comparative example of the third embodiment of the present technology.

With the selection section 17z according to the comparative example illustrated in FIG. 15, signals outputted from the active pixels P1 to P6 defined in the pixel defining ranges A1 to A6 illustrated in FIG. 14 can be selected and be outputted to the time measuring circuits 50 to 55, respectively. However, in the selection section 17y according to the comparative example illustrated in FIG. 15, the selection circuits M0 to M5 are each formed of seven multiplexers. Accordingly, a total of 48 multiplexers are necessary. Consequently, the circuit scale is increased, and signal paths are extended, so that timing skew between pixels is likely to be increased.

Selection Section According to Third Embodiment

In contrast, a selection section 17d according to the third embodiment will be explained with reference to FIG. 16A. The configurations of the vertical-direction and horizontal-direction selection circuits M00 to M017 in the selection section 17d according to the third embodiment are identical to those of the selection circuits M00 to M017 in the selection section 17z according to the comparative example illustrated in FIG. 15. However, the configuration of the selection circuit M018 in the selection section 17d according to the third embodiment is different from those of the selection circuits M0 to M5 in the selection section 17z according to the comparative example illustrated in FIG. 15.

The selection circuit M018 includes first-stage multiplexers M10, M11, M12, M13, M14, M15, M16, M17, M18, M19, M110, and M111, second-stage multiplexers M20, M21, M22, M23, M24, M25, M26, M27, M28, and M29, and third-stage multiplexers M30, M31, M32, M33, M34, and M35. The first-stage multiplexers M10 to M111, the second-stage multiplexers M20 to M29, and the third-stage multiplexers M30 to M35 are each connected to the control section 3 illustrated in FIG. 1 and are each operated according to a control signal transmitted from the control section 3.

The input side of the first-stage multiplexer M10 is connected to the selection circuits M00 and M01, and the output side of the first-stage multiplexer M10 is connected to the second-stage multiplexer M20. The first-stage multiplexer M10 performs a multiplexing process of selecting either the one signal selected and outputted by the selection circuit M00 or the one signal selected and outputted by the selection circuit M01 and outputting the selected signal to the second-stage multiplexer M20.

The input side of the first-stage multiplexer M11 is connected to the selection circuits M03 and M04, and the output side of the first-stage multiplexer M11 is connected to both the second-stage multiplexers M20 and M21. The first-stage multiplexer M11 performs a multiplexing process of selecting either the one signal selected and outputted by the selection circuit M03 or the one signal selected and outputted by the selection circuit M04 and outputting the selected signal to the second-stage multiplexers M20 and M21.

The input side of the first-stage multiplexer M12 is connected to the selection circuits M06 and M07, and the output side of the first-stage multiplexer M12 is connected to the second-stage multiplexers M21 and M22. The first-stage multiplexer M12 performs a multiplexing process of selecting either the one signal selected and outputted by the selection circuit M06 or the one signal selected and outputted by the selection circuit M07 and outputting the selected signal to the second-stage multiplexers M21 and M21.

The input side of the first-stage multiplexer M13 is connected to the selection circuits M09 and M010, and the output side of the first-stage multiplexer M13 is connected to both the second-stage multiplexers M22 and M23. The first-stage multiplexer M13 performs a multiplexing process of selecting either the one signal selected and outputted by the selection circuit M09 or the one signal selected and outputted by the selection circuit M010 and outputting the selected signal to the second-stage multiplexers M22 and M23. The circuit configurations of the first-stage multiplexers M14 to M111 are similar to those of the first-stage multiplexers M10 to M13, and thus, a redundant explanation thereof is omitted.

The input side of the second-stage multiplexer M20 is connected to the first-stage multiplexers M10 and M11, and the output side of the second-stage multiplexer M20 is connected to the third-stage multiplexer M30. The second-stage multiplexer M20 performs a multiplexing process of selecting either the one signal selected and outputted by the first-stage multiplexer M10 or the one signal selected and outputted by the first-stage multiplexer M11 and outputting the selected signal to the third-stage multiplexer M30.

The input side of the second-stage multiplexer M21 is connected to the first-stage multiplexers M11 and M12, and the output side of the second-stage multiplexer M21 is connected to the third-stage multiplexer M31. The second-stage multiplexer M21 performs a multiplexing process of selecting either the one signal selected and outputted by the first-stage multiplexer M11 or the one signal selected and outputted by the first-stage multiplexer M12 and outputting the selected signal to the third-stage multiplexer M31.

The input side of the second-stage multiplexer M22 is connected to the first-stage multiplexers M12 and M13, and the output side of the second-stage multiplexer M22 is connected to both the third-stage multiplexers M30 and M32. The second-stage multiplexer M22 performs a multiplexing process of selecting either the one signal selected and outputted by the first-stage multiplexer M12 or the one signal selected and outputted by the first-stage multiplexer M13 and outputting the selected signal to the third-stage multiplexers M30 and M32. The circuit configurations of the second-stage multiplexers M23 to M29 are similar to those of the second-stage multiplexers M20 to M22, and thus, a redundant explanation thereof is omitted.

The input side of the third-stage multiplexer M30 is connected to the second-stage multiplexers M20 and M22, and the output side of the third-stage multiplexer M30 is connected to the time measuring circuit 50. The third-stage multiplexer M30 performs a multiplexing process of selecting either the one signal selected and outputted by the second-stage multiplexer M20 or the one signal selected and outputted by the second-stage multiplexer M22 and outputting the selected signal to the time measuring circuit 50. The circuit configurations of the third-stage multiplexers M31 to M35 are similar to that of the third-stage multiplexer M30, and thus, a redundant explanation thereof is omitted.

In the selection section 17d according to the third embodiment of the present technology, the multiplexers, for which the pixel defining ranges overlap each other in the selection section 17z according to the comparative example illustrated in FIG. 15 are adaptable to sharing usage. That is, by modifying the two first-stage multiplexers M11 and M14 in the selection section 17z according to the comparative example illustrated in FIG. 15 so as to be adaptable to sharing usage, the single first-stage multiplexer M11 in the selection section 17d according to the third embodiment illustrated in FIG. 16A is obtained.

Figure 16A:
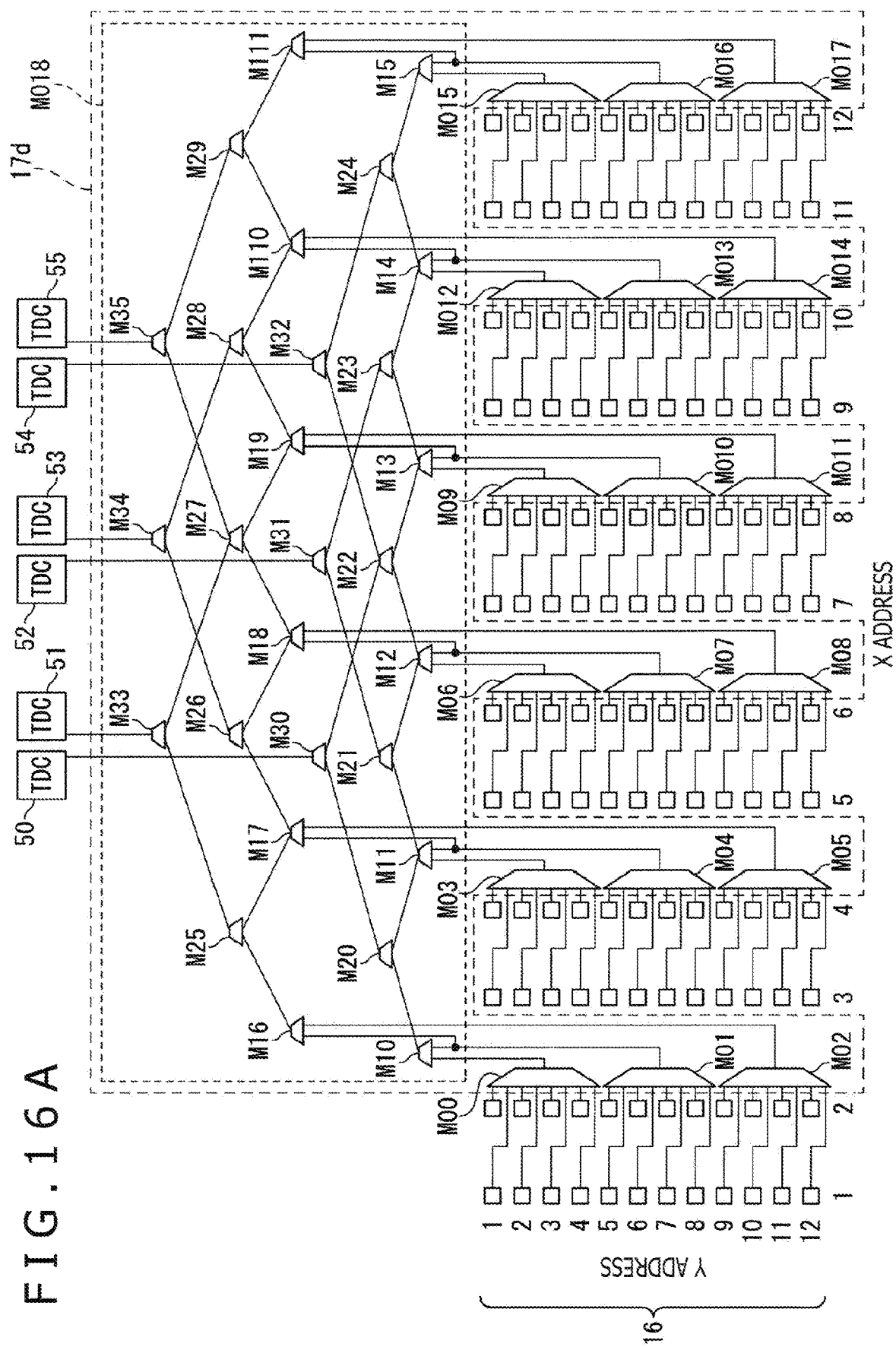
FIG. 16A is a schematic view of one example of a selection section according to the third embodiment of the present technology.

Also, by modifying the three first-stage multiplexers M12, M15, and M18 in the selection section 17z according to the comparative example illustrated in FIG. 15 so as to be adaptable to sharing usage, the single first-stage multiplexer M12 in the selection section 17d according to the third embodiment illustrated in FIG. 16A is obtained. Also, by modifying the three first-stage multiplexers M13, M16, and M19 in the selection section 17z according to the comparative example illustrated in FIG. 15 so as to be adaptable to sharing usage, the single first-stage multiplexer M13 in the selection section 17d according to the third embodiment illustrated in FIG. 16A is obtained.

Also, by modifying the two first-stage multiplexers M17 and M110 in the selection section 17z according to the comparative example illustrated in FIG. 15 so as to be adaptable to sharing usage, the single first-stage multiplexer M14 in the selection section 17d according to the third embodiment illustrated in FIG. 16A is obtained. Also, by modifying the two first-stage multiplexers M113 and M116 in the selection section 17z according to the comparative example illustrated in FIG. 15 so as to be adaptable to sharing usage, the single first-stage multiplexer M17 in the selection section 17d according to the third embodiment illustrated in FIG. 16A is obtained.

Also, by modifying the three first-stage multiplexers M114, M117, and M120 in the selection section 17z according to the comparative example illustrated in FIG. 15 so as to be adaptable to sharing usage, the single first-stage multiplexer M18 in the selection section 17d according to the third embodiment illustrated in FIG. 16A is obtained. Also, by modifying the three first-stage multiplexers M115, M118, and M121 in the selection section 17z according to the comparative example illustrated in FIG. 15 so as to be adaptable to sharing usage, the single first-stage multiplexer M19 in the selection section 17d according to the third embodiment illustrated in FIG. 16A is obtained. Also, by modifying the two first-stage multiplexers M119 and M122 in the selection section 17z according to the comparative example illustrated in FIG. 15 so as to be adaptable to sharing usage, the single first-stage multiplexer M110 in the selection section 17d according to the third embodiment illustrated in FIG. 16A is obtained.

Also, by modifying the two second-stage multiplexers M21 and M24 in the selection section 17z according to the comparative example illustrated in FIG. 15 so as to be adaptable to sharing usage, the single second-stage multiplexer M22 in the selection section 17d according to the third embodiment illustrated in FIG. 16A is obtained. Also, by modifying the two second-stage multiplexers M27 and M210 in the selection section 17z according to the comparative example illustrated in FIG. 15 so as to be adaptable to sharing usage, the single second-stage multiplexer M27 in the selection section 17d according to the third embodiment illustrated in FIG. 16A is obtained.

Accordingly, the selection section 17d according to the third embodiment of the present technology can be formed of a total of 28 multiplexers. Therefore, the circuit scale can be reduced, and timing skew can be improved, compared to the selection section 17z according to the comparative example illustrated in FIG. 15.

In addition, since the multiplexers are set to be adaptable to sharing usage, the selection section 17d according to the third embodiment is subjected to a constraint that two inputs cannot be simultaneously used at a multiplexer modified for sharing usage. However, if the time measuring circuits 50 to 55 are properly connected, any arrangement of active pixels can be realized. Accordingly, the same degree of freedom can be obtained in terms of the functions.

Figure 16B:
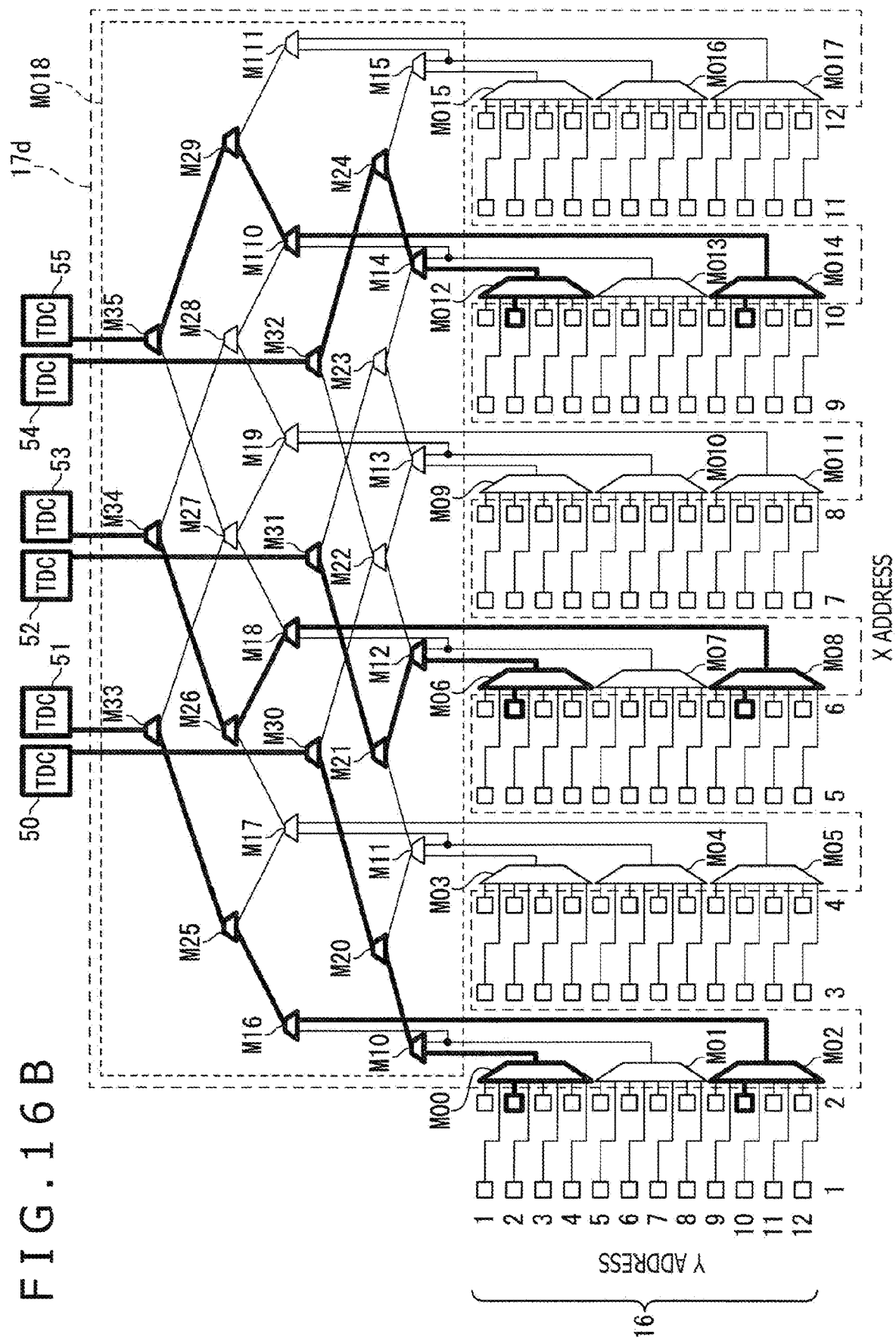
FIG. 16B is a schematic view of one operation example of the selection section illustrated in FIG. 16A.

For example, it is assumed that six pixels at addresses (X, Y)=(2, 2), (2, 10), (6, 2), (6, 10), (10, 2), and (10, 10) are defined as active pixels, as illustrated in FIG. 14. In this case, paths from the six pixels at addresses (2, 2), (2, 10), (6, 2), (6, 10), (10, 2), and (10, 10) to the time measuring circuits 51 to 55 are selected, as highlighted with thick lines in FIG. 16B.

Specifically, a signal outputted from the pixel at the address (2, 2) is selected by the selection circuit M00, is further selected by the first-stage multiplexer M10, the second-stage multiplexer M20, and the third-stage multiplexer M30 in the selection circuit M018, and is outputted to the time measuring circuit 50. A signal outputted from the pixel at the address (2, 10) is selected by the selection circuit M02, is further selected by the first-stage multiplexer M16, the second-stage multiplexer M25, and the third-stage multiplexer M33 in the selection circuit M018, and is outputted to the time measuring circuit 51. A signal outputted from the pixel at the address (6, 2) is selected by the selection circuit M06, is further selected by the first-stage multiplexer M12, the second-stage multiplexer M21, and the third-stage multiplexer M31 in the selection circuit M018, and is outputted to the time measuring circuit 52.

A signal outputted from the pixel at the address (6, 10) is selected by the selection circuit M08, is further selected by the first-stage multiplexer M18, the second-stage multiplexer M26, and the third-stage multiplexer M34 in the selection circuit M018, and is outputted to the time measuring circuit 53. A signal outputted from the pixel at the address (10, 2) is selected by the selection circuit M012, is further selected by the first-stage multiplexer M14, the second-stage multiplexer M24, and the third-stage multiplexer M32 in the selection circuit M018, and is outputted to the time measuring circuit 54. A signal outputted from the pixel at the address (10, 10) is selected by the selection circuit M014, is further selected by the first-stage multiplexer M110, the second-stage multiplexer M29, and the third-stage multiplexer M35 in the selection circuit M018, and is outputted to the time measuring circuit 55.

Effects of Third Embodiment

In the ranging system according to the third embodiment, the control section 3 defines the multiple pixels included in the pixel array 16 of the light receiving section 2 as active pixels and non-active pixels, as explained so far. Further, signals outputted from the pixels defined as active pixels are outputted from the light receiving section 2 to the ranging processing section 4. Accordingly, an optical displacement such as an aberration or a magnification in a light spot during manufacturing and assembling, etc. can be corrected.

Moreover, since the selection section 17d according to the third embodiment illustrated in FIG. 16A is provided in the ranging system according to the third embodiment, switching between an active pixel and a non-active pixel can be properly performed. In addition, compared to the selection section 17z according to the comparative example illustrated in FIG. 15, the circuit scale can be reduced, and timing skew can be improved, because the multiplexers are adaptable to sharing usage.

Other Embodiments

The present technology has been exemplified above by the first to third embodiments and the modifications. However, it should not be understood that the description and the drawings included in the present disclosure delimit the present technology. From the present disclosure, various modifications, embodiments, and operational technologies will be apparent to a person skilled in the art.

For example, the selection section 17 according to the first embodiment, the selection section 17a according to the first modification of the first embodiment, the selection section 17b according to the second modification of the first embodiment, the selection section 17c according to the second embodiment, and the selection section 17d according to the third embodiment have been described, but the selection section is not limited to those described above. That is, it is sufficient if the selection section according to the present technology includes at least a first multiplexer that selects either a signal outputted from a first pixel in the pixel array 16 or a signal outputted from a second pixel in the pixel array 16, a second multiplexer that selects either a signal outputted from a third pixel in the pixel array 16 or a signal outputted from a fourth pixel in the pixel array 16, a third multiplexer that selects either a signal outputted from a fifth pixel in the pixel array 16 or a signal outputted from a sixth pixel in the pixel array 16, a fourth multiplexer that selects either the signal selected by the first multiplexer or the signal selected by the second multiplexer, and a fifth multiplexer that selects either the signal selected by the second multiplexer or the signal selected by the third multiplexer. Further, it is sufficient if the first time measuring section (TDC) is connected to the output side of the fourth multiplexer while the second time measuring section (TDC) is connected to the output side of the fifth multiplexer.

Further, each of the ranging systems according to the first to third embodiments may be a ranging sensor for mobile apparatuses, or an on-vehicle ranging sensor such as a LiDAR.

If the concept of the technology disclosed by the above embodiments is understood in such a manner, it will be apparent to a person skilled in the art that various modifications, embodiments, and operational technologies can be included in the present technology. In addition, it goes without saying that the present technology includes, for example, a configuration obtained by applying the components having been explained in the above embodiments and the above modifications as desired, that is, includes various embodiments that are not described herein. Therefore, the technical scope of the present technology should be specified only by the invention-specifying features according to the claims within reason based on the above exemplifying explanation.

It is to be noted that the present technology can have the following configurations.

(1)

A light receiving device including:
a light receiving section including a pixel array; and
a control section that defines multiple pixels included in the pixel array as an active pixel and a non-active pixel and causes a signal outputted from a pixel defined as the active pixel to be outputted from the light receiving section.

(2)

The light receiving device according to (1), in which the control section defines multiple pixel defining ranges in the pixel array and defines the active pixel in each of the multiple pixel defining ranges.

(3)

The light receiving device according to (2), in which the control section defines the multiple pixel defining ranges in such a way that the multiple pixel defining ranges partially overlap each other.

(4)

The light receiving device according to any one of (1) to (3), in which the control section performs switching between the active pixel and the non-active pixel.

(5)

The light receiving device according to (4), in which the light receiving section includes a selection section that selects a signal from among signals respectively outputted from the multiple pixels and outputs the selected signal, and, by controlling the selection section, the control section performs switching between the active pixel and the non-active pixel.

(6)

The light receiving device according to (5), in which the selection section includes
a first multiplexer that selects either a signal outputted from a first pixel in the pixel array or a signal outputted from a second pixel in the pixel array,
a second multiplexer that selects either a signal outputted from a third pixel in the pixel array or a signal outputted from a fourth pixel in the pixel array,
a third multiplexer that selects either a signal outputted from a fifth pixel in the pixel array or a signal outputted from a sixth pixel in the pixel array,
a fourth multiplexer that selects either the signal selected by the first multiplexer or the signal selected by the second multiplexer, and
a fifth multiplexer that selects either the signal selected by the second multiplexer or the signal selected by the third multiplexer.

(7)

The light receiving device according to (6), further including:
a first time measuring section connected to an output side of the fourth multiplexer; and a second time measuring section connected to an output side of the fifth multiplexer.

(8) The light receiving device according to (7), in which the selection section further includes
a sixth multiplexer that selects either a signal outputted from the second pixel or a signal outputted from the third pixel,
a seventh multiplexer that selects either a signal outputted from the fourth pixel or a signal outputted from the fifth pixel, and
an eighth multiplexer that selects either the signal selected by the sixth multiplexer or the signal selected by the seventh multiplexer.

(9) The light receiving device according to (8), further including:
a third time measuring section connected to an output side of the eighth multiplexer.

(10) A ranging system including:
a light emitting section that emits light;
a light receiving section including a pixel array that receives reflection light resulting from reflection of the emitted light by an object;
a control section that defines multiple pixels included in the pixel array as an active pixel and a non-active pixel, and causes a signal outputted from a pixel defined as the active pixel, to be outputted from the light receiving section; and
a ranging processing section that, on the basis of the signal outputted from the active pixel, calculates a distance to the object according to a time interval between light emission from the light source and reception of the reflection light at the light receiving section.

(11) A light receiving method including:
defining multiple pixels included in a pixel array as an active pixel and a non-active pixel, the pixel array being included in a light receiving section; and
causing a signal outputted from a pixel defined as the active pixel to be outputted from the light receiving section.

REFERENCE SIGNS LIST

1: Light emitting section
2: Light receiving section
3: Control section
4: Ranging processing section
5: Time measuring section
6: Histogram creating section
7: Distance calculating section
8: Communication interface (IF) section
10: Light receiving device
11: Light source
12: Emitter lens
13: Projection mirror
14: Micromirror
15: Receiver lens
16: Pixel array
17, 17a, 17b, 17c, 17d: Selection section
20: Object
50-59: Time measuring circuit (TDC)
A1, A2, A3, A4, A5, A6: Pixel defining range
M00, M01, M02, M03, M04, M05, M06, M07, M08, M09, M10, M011, M012, M013, M014, M015, M016, M017, M018: Selection circuit
M10, M11, M12, M13, M14, M15, M16, M17, M18, M19, M110, M111, M20, M21, M22, M23, M24, M25, M26, M27, M28, M29, M30, M31, M32, M33, M34, M35: Multiplexer
P1, P2, P3, P4, P5, P6, Pa: Active pixel
Pb: Non-active pixel

The invention claimed is:

1. A light receiving device, comprising:
a light receiving section including a pixel array and a selection section, wherein
the pixel array includes multiple pixels, and
the selection section is configured to:
select a signal from a plurality of signals outputted from the multiple pixels; and
output the selected signal; and
a control section configured to:
define the multiple pixels included in the pixel array as an active pixel and a non-active pixel;
switch between the active pixel and the non-active pixel based on a control of the selection section; and
control a signal outputted from the active pixel to be outputted from the light receiving section.

2. The light receiving device according to claim 1, wherein
the control section is further configured to:
define multiple pixel defining ranges in the pixel array, and
define the active pixel in each of the multiple pixel defining ranges.

3. The light receiving device according to claim 2, wherein
the control section is further configured to define the multiple pixel defining ranges such that the multiple pixel defining ranges partially overlap each other.

4. The light receiving device according to claim 1, wherein
the selection section includes
a first multiplexer configured to select either a signal outputted from a first pixel in the pixel array or a signal outputted from a second pixel in the pixel array,
a second multiplexer configured to select either a signal outputted from a third pixel in the pixel array or a signal outputted from a fourth pixel in the pixel array,
a third multiplexer configured to select either a signal outputted from a fifth pixel in the pixel array or a signal outputted from a sixth pixel in the pixel array,
a fourth multiplexer configured to select either the signal selected by the first multiplexer or the signal selected by the second multiplexer, and
a fifth multiplexer configured to select either the signal selected by the second multiplexer or the signal selected by the third multiplexer.

5. The light receiving device according to claim 4, further comprising:
a first time measuring section configured to connect to an output side of the fourth multiplexer; and
a second time measuring section configured to connect to an output side of the fifth multiplexer.

6. The light receiving device according to claim 5, wherein
the selection section further includes
a sixth multiplexer configured to select either a signal outputted from the second pixel or a signal outputted from the third pixel,
a seventh multiplexer configured to select either a signal outputted from the fourth pixel or a signal outputted from the fifth pixel, and
an eighth multiplexer configured to select either the signal selected by the sixth multiplexer or the signal selected by the seventh multiplexer.

7. The light receiving device according to claim 6, further comprising:
a third time measuring section configured to connect to an output side of the eighth multiplexer.

8. A ranging system, comprising:
a light emitting section configured to emit light;
a light receiving section including a pixel array and a selection section, wherein
the light receiving section is configured to receive reflection light which results from reflection of the emitted light by an object,
the pixel array includes multiple pixels, and
the selection section is configured to:
select a signal from a plurality of signals outputted from the multiple pixels; and
output the selected signal;
a control section configured to:
define the multiple pixels included in the pixel array as an active pixel and a non-active pixel;
switch between the active pixel and the non-active pixel based on a control of the selection section; and
control a signal outputted from the active pixel to be outputted from the light receiving section; and
a ranging processing section configured to calculate, based on the signal outputted from the active pixel, a distance to the object based on a time interval between light emission from a light source and reception of the reflection light at the light receiving section.

9. A light receiving method, comprising:
selecting a signal from a plurality of signals outputted from multiple pixels, wherein the multiple pixels are included in a pixel array, and the pixel array is included in a light receiving section;
outputting the selected signal;
defining the multiple pixels as an active pixel and a non-active pixel;
switching between the active pixel and the non-active pixel based on the selected signal; and
controlling signal outputted from the active pixel to be outputted from the light receiving section.

* * * * *